United States Patent
Soriaga et al.

(10) Patent No.: US 11,129,127 B2
(45) Date of Patent: Sep. 21, 2021

(54) NETWORK CALIBRATION WITH ROUND-TRIP-TIME (RTT)-BASED POSITIONING PROCEDURES

(71) Applicant: QUALCOMM Incorporated, San Diego, CA (US)

(72) Inventors: Joseph Binamira Soriaga, San Diego, CA (US); Alexandros Manolakos, San Diego, CA (US); Naga Bhushan, San Diego, CA (US); Charles Edward Wheatley, Del Mar, CA (US); Tingfang Ji, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/721,500

(22) Filed: Dec. 19, 2019

(65) Prior Publication Data
US 2020/0229124 A1    Jul. 16, 2020

(30) Foreign Application Priority Data
Jan. 11, 2019    (GR) .............................. 20190100020

(51) Int. Cl.
*H04W 24/00* (2009.01)
*H04W 64/00* (2009.01)
(Continued)

(52) U.S. Cl.
CPC ........... *H04W 64/003* (2013.01); *G01S 5/021* (2013.01); *G01S 5/14* (2013.01); *H04L 43/0864* (2013.01); *H04L 47/283* (2013.01); *H04W 4/023* (2013.01)

(58) Field of Classification Search
CPC ..... H04W 64/003; H04W 4/023; G01S 5/021; G01S 5/14; H04L 43/0864; H04L 47/283; H04M 1/72519; H04M 1/72522
(Continued)

(56) References Cited

U.S. PATENT DOCUMENTS

| 2012/0078383 A1* | 3/2012 | Takahashi | ........... H04L 41/0859 700/7 |
| 2013/0243140 A1* | 9/2013 | Buhl | ......................... H04L 7/04 375/362 |

(Continued)

FOREIGN PATENT DOCUMENTS

| WO | 2015116322 A2 | 8/2015 |
| WO | 2016181198 A1 | 11/2016 |

OTHER PUBLICATIONS

Huawei, et al: "Discussion on NR Positioning Technologies," 3GPP Draft; R2-1708210, 3rd Generation Partnership Project (3GPP), Mobile Competence Centre; 650, Route Des Lucioles; F-06921 Sophia-Antipolis Cedex; France, vol. RAN WG2, no. Berlin, Germany; Aug. 21, 2017-Aug. 25, 2017, Aug. 20, 2017, XP051318113, 6 pages, Retrieved from the Internet: URL: http://www.3gpp.org/ftp/Meetings_3GPP_SYNC/RAN2/Docs/ [retrieved on Aug. 20, 2017].

(Continued)

*Primary Examiner* — Danh C Le
(74) *Attorney, Agent, or Firm* — Qualcomm Incorporated

(57) ABSTRACT

Disclosed are techniques for determining locations of reference nodes. In an aspect, an apparatus transmits a request to a first reference node to perform a first round-trip-time (RTT) procedure with a second reference node, determines a first distance between the first reference node and the second reference node based on the RTT procedure, determines relative locations of the first and second reference nodes with respect to each other, and determines absolute (Continued)

locations of the first and second reference nodes from their relative locations based on at least one of the first and second reference nodes having a known absolute location and at least one known angle-of-arrival (AoA) or angle-of-departure (AoD) of at least one reference signal.

36 Claims, 17 Drawing Sheets

(51) Int. Cl.
　　　　H04L 12/26　　　(2006.01)
　　　　H04L 12/841　　(2013.01)
　　　　G01S 5/14　　　　(2006.01)
　　　　G01S 5/02　　　　(2010.01)
　　　　H04W 4/02　　　 (2018.01)
(58) Field of Classification Search
　　　USPC .................. 455/456.1, 456.6, 550.1, 418
　　　See application file for complete search history.

(56) References Cited

U.S. PATENT DOCUMENTS

| | | | |
|---|---|---|---|
| 2014/0051426 A1* | 2/2014 | Siomina | H04W 36/0088 |
| | | | 455/422.1 |
| 2014/0308976 A1* | 10/2014 | Garin | G01S 5/0226 |
| | | | 455/456.2 |
| 2014/0321481 A1* | 10/2014 | Buhl | H04L 12/422 |
| | | | 370/503 |
| 2015/0148050 A1* | 5/2015 | Siomina | H04L 27/2605 |
| | | | 455/452.1 |
| 2015/0207877 A1* | 7/2015 | Ito | H04L 67/1095 |
| | | | 709/248 |
| 2015/0327191 A1* | 11/2015 | Park | H04W 56/002 |
| | | | 370/350 |
| 2015/0382152 A1* | 12/2015 | Lindskog | G01S 13/765 |
| | | | 455/456.2 |
| 2017/0127373 A1* | 5/2017 | Deshpande | H04W 12/0609 |
| 2017/0195893 A1* | 7/2017 | Lee | H04L 5/006 |
| 2017/0261591 A1* | 9/2017 | Zhang | G01S 5/14 |
| 2017/0332208 A1* | 11/2017 | Cardoso de Moura | |
| | | | H04W 24/08 |
| 2018/0124584 A1* | 5/2018 | Venkatraman | H04L 65/1006 |
| 2018/0310133 A1* | 10/2018 | Ramasamy | H04W 64/003 |
| 2019/0069267 A1* | 2/2019 | Seok | G01S 5/0284 |
| 2019/0104384 A1* | 4/2019 | Abou-Rizk | G01S 5/08 |
| 2019/0159161 A1* | 5/2019 | Kakani | G01S 5/14 |

OTHER PUBLICATIONS

International Search Report and Written Opinion—PCT/US2019/068104—ISA/EPO—date Apr. 6, 2020.

\* cited by examiner

Ideal synchronization: PRS at frame start is delayed by $T_{prop}$

Sync error (specification impact: report)

Imperfect synchronization: PRS at frame start is delayed by more (or less) than $T_{prop}$

NETWORK CALIBRATION WITH ROUND-TRIP-TIME (RTT)-BASED POSITIONING PROCEDURES

CROSS-REFERENCE TO RELATED APPLICATIONS

The present application for patent claims priority under 35 U.S.C. § 119 to Greek Patent Application No. 20190100020, entitled "NETWORK CALIBRATION WITH ROUND-TRIP-TIME (RTT)-BASED POSITIONING PROCEDURES," filed Jan. 11, 2019, assigned to the assignee hereof, and expressly incorporated herein by reference in its entirety.

BACKGROUND OF THE DISCLOSURE

1. Field of the Disclosure

Aspects of the disclosure relate generally to telecommunications, and more particularly to network calibration with round trip time (RTT)-based positioning procedures.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as "New Radio" (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of determining locations of reference nodes in a wireless network includes transmitting a request to a first reference node to perform a first round-trip-time (RTT) procedure with a second reference node, determining a first distance between the first reference node and the second reference node based on the first RTT procedure performed by the first reference node and the second reference node, wherein at least one of the first reference node and the second reference node transmits a beamformed reference signal to the other of the first reference node and the second reference node as part of the first RTT procedure, determining relative locations of the first and second reference nodes with respect to each other, and determining absolute locations of the first and second reference nodes from the relative locations of the first and second reference nodes based on at least one of the first and second reference nodes having a known absolute location and at least one known angle-of-arrival (AoA) or angle-of-departure (AoD) of at least one reference signal sent or received by the first or second reference nodes.

In an aspect, a method of synchronizing reference nodes in a wireless network includes determining, by a first reference node, a propagation time between the first reference node and a second reference node based on an RTT procedure performed by the first reference node and the second reference node, receiving, at the first reference node, a reference signal from the second reference node at an observed time with respect to a frame time of the wireless network, the reference signal transmitted by the second reference node at a first time with respect to the frame time of the wireless network, and based on the observed time being greater or less than an expected time to receive the reference signal, adjusting, by the first reference node, a clock of the first reference node to align with the first time by setting the observed time to the expected time, wherein the expected time comprises the first time plus the propagation time.

In an aspect, an apparatus includes a memory, a communication device, and at least one processor, the at least one processor configured to: cause the communication device to transmit a request to a first reference node to perform a first RTT procedure with a second reference node, determine a first distance between the first reference node and the second reference node based on the RTT procedure performed by the first reference node and the second reference node, wherein at least one of the first reference node and the second reference node transmits a beamformed reference signal to the other of the first reference node and the second reference node as part of the first RTT procedure, determine relative locations of the first and second reference nodes with respect to each other, and determine absolute locations of the first and second reference nodes from the relative locations of the first and second reference nodes based on at least one of the first and second reference nodes having a known absolute location and at least one known AoA or AoD of at least one reference signal sent or received by the first or second reference nodes.

In an aspect, a first reference node in a wireless network includes a memory, a communication device, and at least one processor, the at least one processor configured to: determine a propagation time between the first reference node and a second reference node based on an RTT procedure performed by the first reference node and the second reference node, receive, via the communication device, a reference signal from the second reference node at an observed time with respect to a frame time of the wireless network, the reference signal transmitted by the second reference node at a first time with respect to the frame time of the wireless network, and adjust, based on the observed time being greater or less than an expected time to receive the reference signal, a clock of the first reference node to align with the first time by setting the observed time to the expected time, wherein the expected time includes the first time plus the propagation time.

In an aspect, an apparatus includes means for transmitting a request to a first reference node to perform a first RTT procedure with a second reference node, means for determining a first distance between the first reference node and the second reference node based on the RTT procedure performed by the first reference node and the second reference node, wherein at least one of the first reference node and the second reference node transmits a beamformed reference signal to the other of the first reference node and the second reference node as part of the first RTT procedure, means for determining relative locations of the first and second reference nodes with respect to each other, and means for determining absolute locations of the first and second reference nodes from the relative locations of the first and second reference nodes based on at least one of the first and second reference nodes having a known absolute location and at least one known AoA or AoD of at least one reference signal sent or received by the first or second reference nodes.

In an aspect, a first reference node in a wireless network includes means for determining a propagation time between the first reference node and a second reference node based on an RTT procedure performed by the first reference node and the second reference node, means for receiving a reference signal from the second reference node at an observed time with respect to a frame time of the wireless network, the reference signal transmitted by the second reference node at a first time with respect to the frame time of the wireless network, and means for adjusting, based on the observed time being greater or less than an expected time to receive the reference signal, a clock of the first reference node to align with the first time by setting the observed time to the expected time, wherein the expected time includes the first time plus the propagation time.

In an aspect, a non-transitory computer-readable medium storing computer-executable instructions includes computer-executable instructions comprising at least one instruction instructing an apparatus to transmit a request to a first reference node to perform a first RTT procedure with a second reference node, at least one instruction instructing the apparatus to determine a first distance between the first reference node and the second reference node based on the RTT procedure performed by the first reference node and the second reference node, wherein at least one of the first reference node and the second reference node transmits a beamformed reference signal to the other of the first reference node and the second reference node as part of the first RTT procedure, at least one instruction instructing the apparatus to determine relative locations of the first and second reference nodes with respect to each other, and at least one instruction instructing the apparatus to determine absolute locations of the first and second reference nodes from the relative locations of the first and second reference nodes based on at least one of the first and second reference nodes having a known absolute location and at least one known AoA or AoD of at least one reference signal sent or received by the first or second reference nodes.

In an aspect, a non-transitory computer-readable medium storing computer-executable instructions includes computer-executable instructions comprising at least one instruction instructing a first reference node to determine a propagation time between the first reference node and a second reference node based on an RTT procedure performed by the first reference node and the second reference node, at least one instruction instructing the first reference node to receive a reference signal from the second reference node at an observed time with respect to a frame time of a wireless network, the reference signal transmitted by the second reference node at a first time with respect to the frame time of the wireless network, and at least one instruction instructing a first reference node to adjust, based on the observed time being greater or less than an expected time to receive the reference signal, a clock of the first reference node to align with the first time by setting the observed time to the expected time, wherein the expected time includes the first time plus the propagation time.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
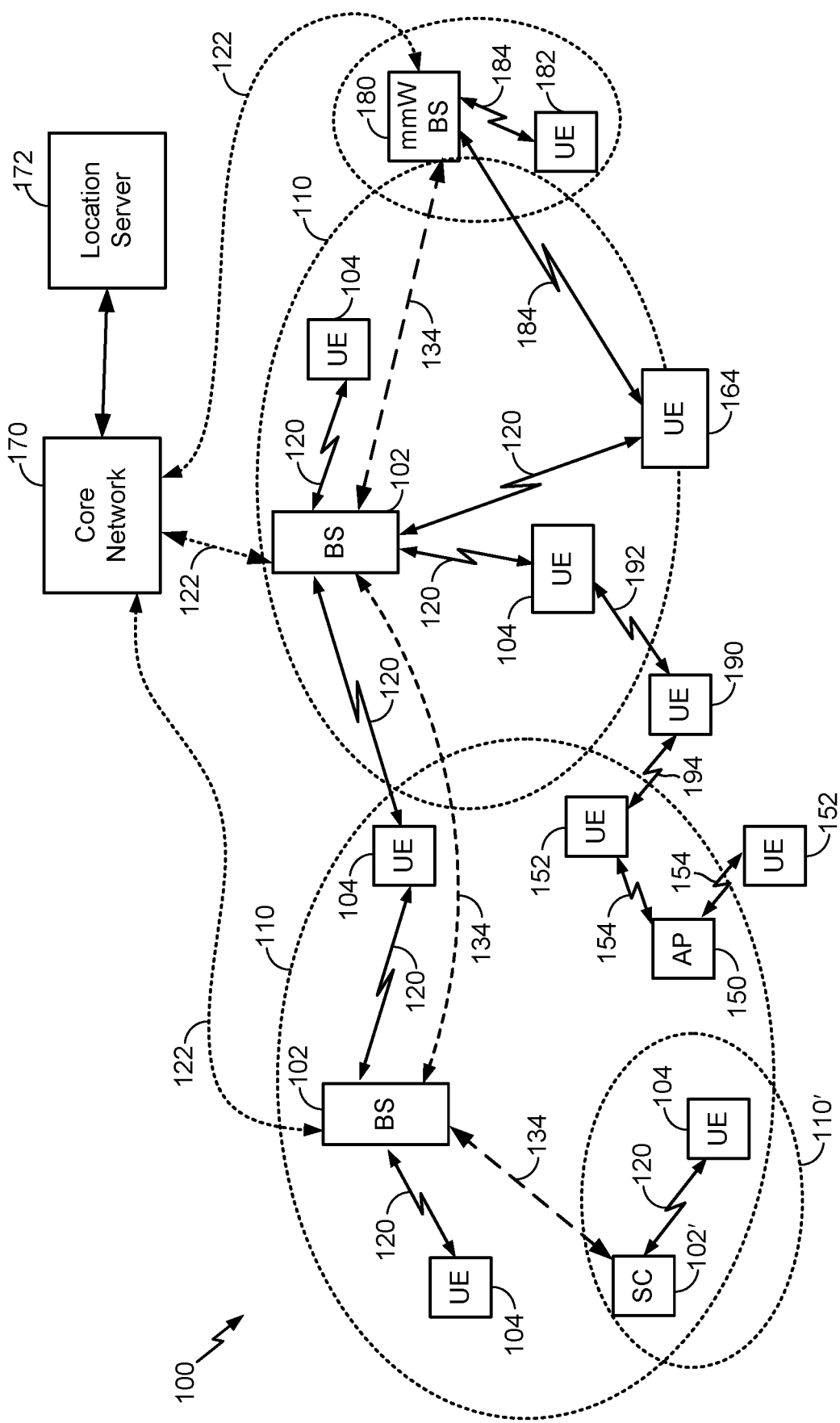
FIG. 1 illustrates an exemplary wireless communications system, according to various aspects.

Elements, stages, steps, and/or actions with the same reference label in different drawings may correspond to one another (e.g., may be similar or identical to one another). Further, some elements in the various drawings may be labelled using a numeric prefix followed by an alphabetic or numeric suffix. Elements with the same numeric prefix but different suffixes may be different instances of the same type of element. The numeric prefix without any suffix is used herein to reference any element with this numeric prefix.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a NR Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

More specifically, LBT is a mechanism by which a transmitter (e.g., a UE on the uplink or a base station on the downlink) applies CCA before using the channel/subband. Thus, before transmission, the transmitter performs a CCA check and listens on the channel/subband for the duration of the CCA observation time, which should not be less than some threshold (e.g., 15 microseconds). The channel may be considered occupied if the energy level in the channel exceeds some threshold (proportional to the transmit power of the transmitter). If the channel is occupied, the transmitter should delay further attempts to access the medium by some random factor (e.g., some number between 1 and 20) times the CCA observation time. If the channel is not occupied, the transmitter can begin transmitting. However, the maximum contiguous transmission time on the channel should be less than some threshold, such as 5 milliseconds.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network.

NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. In an aspect, the UE 190 may be a low-tier UE, and the UE 104 to which it is connected over the D2D P2P link 192 may be a premium UE.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
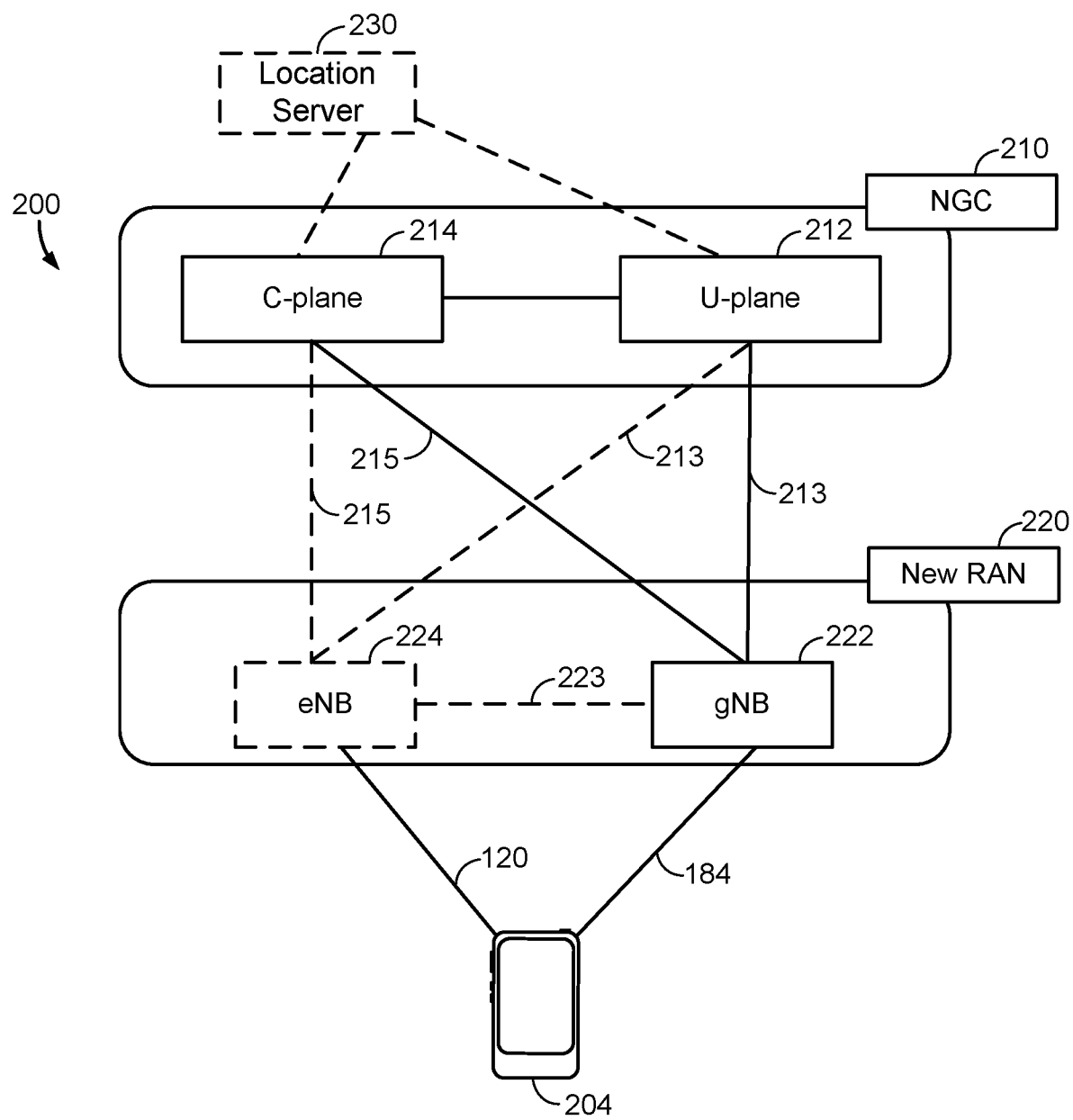
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
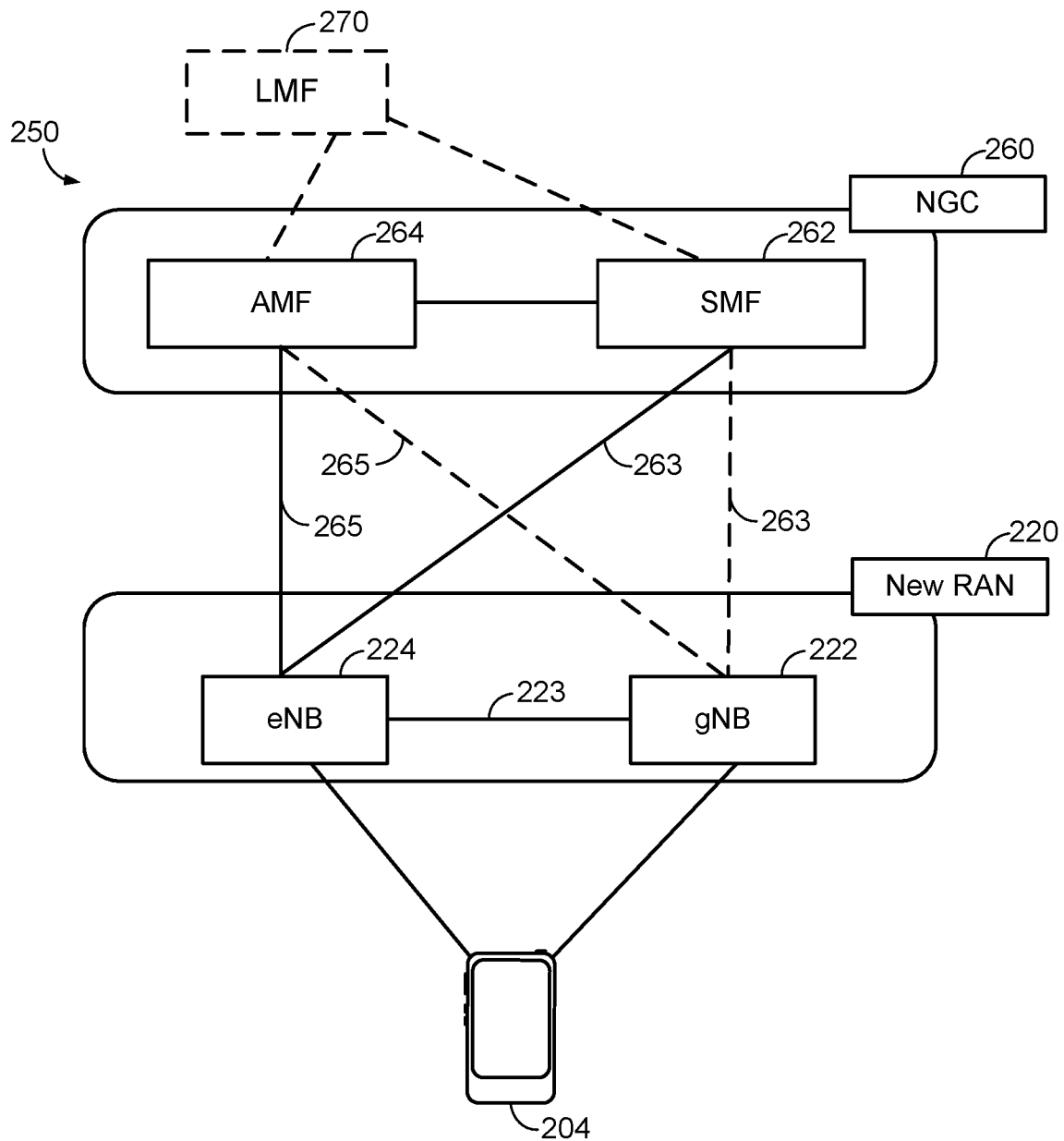

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
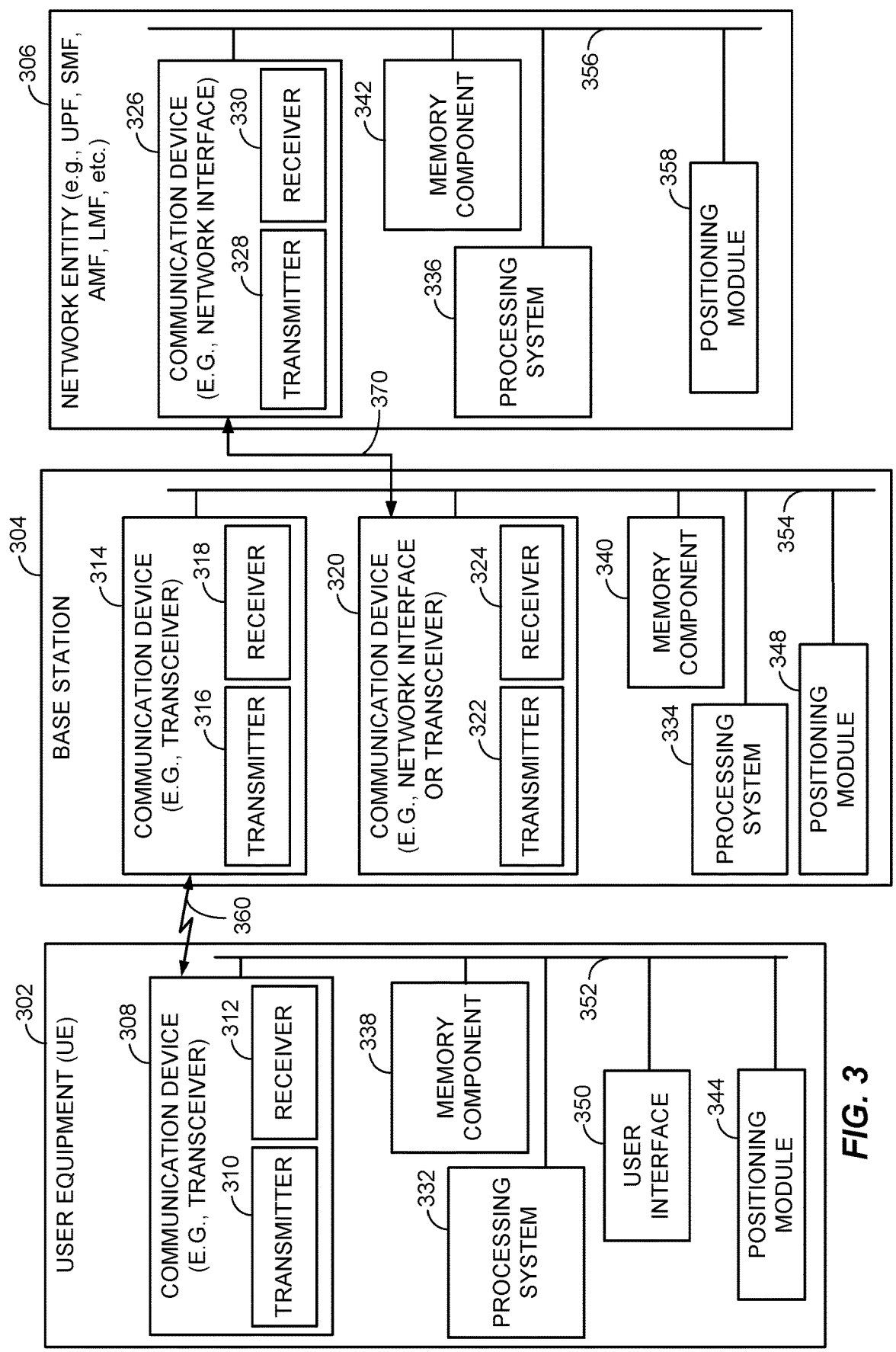
FIG. 3 illustrates exemplary apparatuses in an access network, according to various aspects.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for an RRC layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302 and 304 may include positioning modules 344, 348, and 358, respectively. The positioning modules 344, 348, and 358 may be hardware circuits that are part of or coupled to the processing systems 332, 334, and 336, respectively, that, when executed, cause the apparatuses 302, 304, and 306 to perform the functionality described herein. Alternatively, the positioning modules 344, 348, and 358 may be memory modules stored in the memory components 338, 340, and 342, respectively, that, when executed by the processing systems 332, 34, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, 342, and 358 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, the positioning modules 344, 348, and 358, etc.

Figure 4:
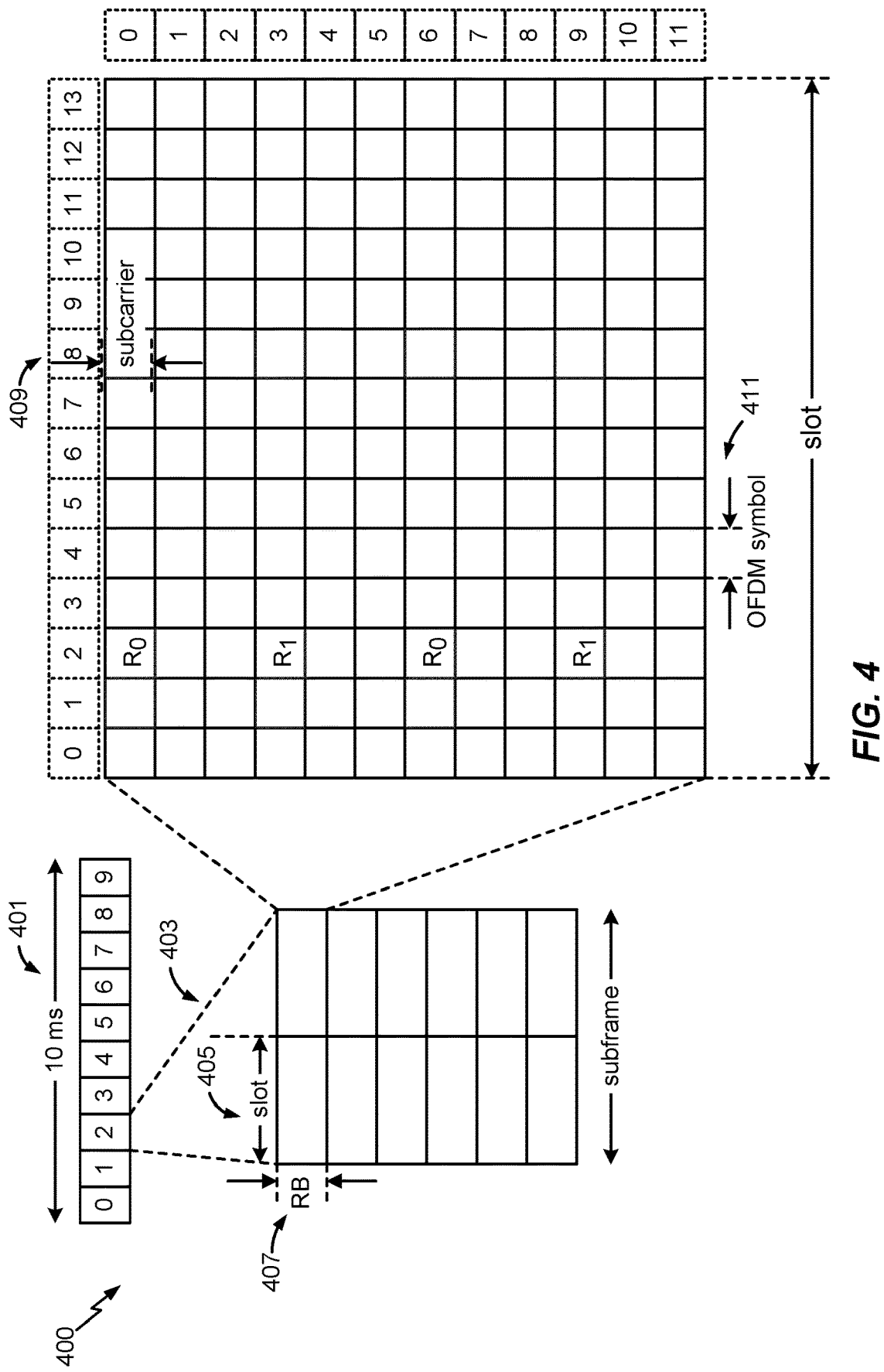
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). FIG. 4 illustrates an example of a downlink frame structure 400 according to aspects of the disclosure. However, as those skilled in the art will readily appreciate, the frame structure for any particular application may be different depending on any number of factors. In FIG. 4, time is represented horizontally (e.g., on the X axis) with time increasing from left to right, while frequency is represented vertically (e.g., on the Y axis) with frequency increasing (or decreasing) from bottom to top. In the time domain, a frame 410 (10 ms) is divided into 10 equally sized subframes 420 (1 ms). Each subframe 420 includes two consecutive time slots 430 (0.5 ms).

A resource grid may be used to represent two time slots 430, each time slot 430 including one or more resource blocks (RBs) 440 (also referred to as "physical resource blocks" or "PRBs" in the frequency domain). In LTE, and in some cases NR, a resource block 440 contains 12 consecutive subcarriers 450 in the frequency domain and, for a normal cyclic prefix (CP) in each OFDM symbol 460, 7 consecutive OFDM symbols 460 in the time domain. A resource of one OFDM symbol length in the time domain and one subcarrier in the frequency domain (represented as a block of the resource grid) is referred to as a resource element (RE). As such, in the example of FIG. 4, there are 84 resource elements in a resource block 440.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers 450, which are also commonly referred to as tones, bins, etc. Each subcarrier 450 may be modulated with data. In general, modulation symbols are sent in the frequency domain with OFDM and in the time domain with SC-FDM. The spacing between adjacent subcarriers 450 may be fixed, and the total number of subcarriers 450 (K) may be dependent on the system bandwidth. For example, the spacing of the subcarriers 450 may be 15 kHz and the minimum resource allocation (resource block) may be 12 subcarriers 450 (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 240 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
| --- | --- | --- | --- | --- | --- | --- |
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

With continued reference to FIG. 4, some of the resource elements, indicated as $R_0$ and $R_1$, include a downlink reference signal (DL-RS). The DL-RS may include cell-specific RS (CRS) (also sometimes called common RS) and UE-specific RS (UE-RS). UE-RS are transmitted only on the resource blocks 440 upon which the corresponding physical downlink shared channel (PDSCH) is mapped. The number of bits carried by each resource element depends on the modulation scheme. Thus, the more resource blocks 440 that a UE receives and the higher the modulation scheme, the higher the data rate for the UE.

In an aspect, the DL-RS may be positioning reference signals (PRS). A base station may transmit radio frames (e.g., radio frames 410), or other physical layer signaling sequences, supporting PRS signals according to frame configurations either similar to, or the same as that, shown in FIG. 4, which may be measured and used for a UE (e.g., any of the UEs described herein) position estimation. Other types of wireless nodes (e.g., a DAS, RRH, UE, AP, etc.) in a wireless communications network may also be configured to transmit PRS signals configured in a manner similar to (or the same as) that depicted in FIG. 4.

A collection of resource elements that are used for transmission of PRS is referred to as a "PRS resource." The collection of resource elements can span multiple PRBs in the frequency domain and N (e.g., 1 or more) consecutive symbol(s) 460 within a slot 430 in the time domain. In a given OFDM symbol 460, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth sub carrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS) in 5G, tracking reference signals (TRS), cell-specific reference signals (CRS), channel state information reference signals (CSI-RS), primary synchronization signals (PSS), secondary synchronization signals (SSS), sounding reference signals (SRS), etc.

In 5G NR, there may not be precise timing synchronization across the network. Instead, it may be sufficient to have coarse time-synchronization across gNBs (e.g., within a cyclic prefix (CP) duration of the OFDM symbols). RTT-based methods generally only need coarse timing synchronization, and as such, are a preferred positioning method in NR.

In a network-centric RTT estimation, the serving base station instructs the UE to scan for/receive the RTT measurement signals from two or more neighboring base stations (and typically the serving base station, as at least three base stations are needed). The one or more base stations transmit RTT measurement signals on low reuse resources (i.e., resources used by the base station to transmit system information), allocated by the network (e.g., location server 230, LMF 270). The UE records the arrival time (also referred to as a receive time, a reception time, a time of reception, or a time of arrival) of each RTT measurement signal relative to the UE's current downlink timing (e.g., as derived by the UE from a downlink signal received from its serving base station), and transmits a common or individual RTT Response message(s) to the one or more base stations (e.g., when instructed by its serving base station) and may include each of the measured arrival times in a payload of the RTT response message(s).

A UE-centric RTT estimation is similar to the network-based method, except that the UE transmits uplink RTT measurement signal(s) (e.g., when instructed by a serving base station or location server), which are received by multiple base stations in the neighborhood of the UE. Each base station responds with a downlink RTT response message, which may include the arrival time of the RTT measurement signal at the gNB in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the arrival (or receive) time(s) of the first message(s) or signal(s) in the RTT response message(s) payload.

Figure 5:
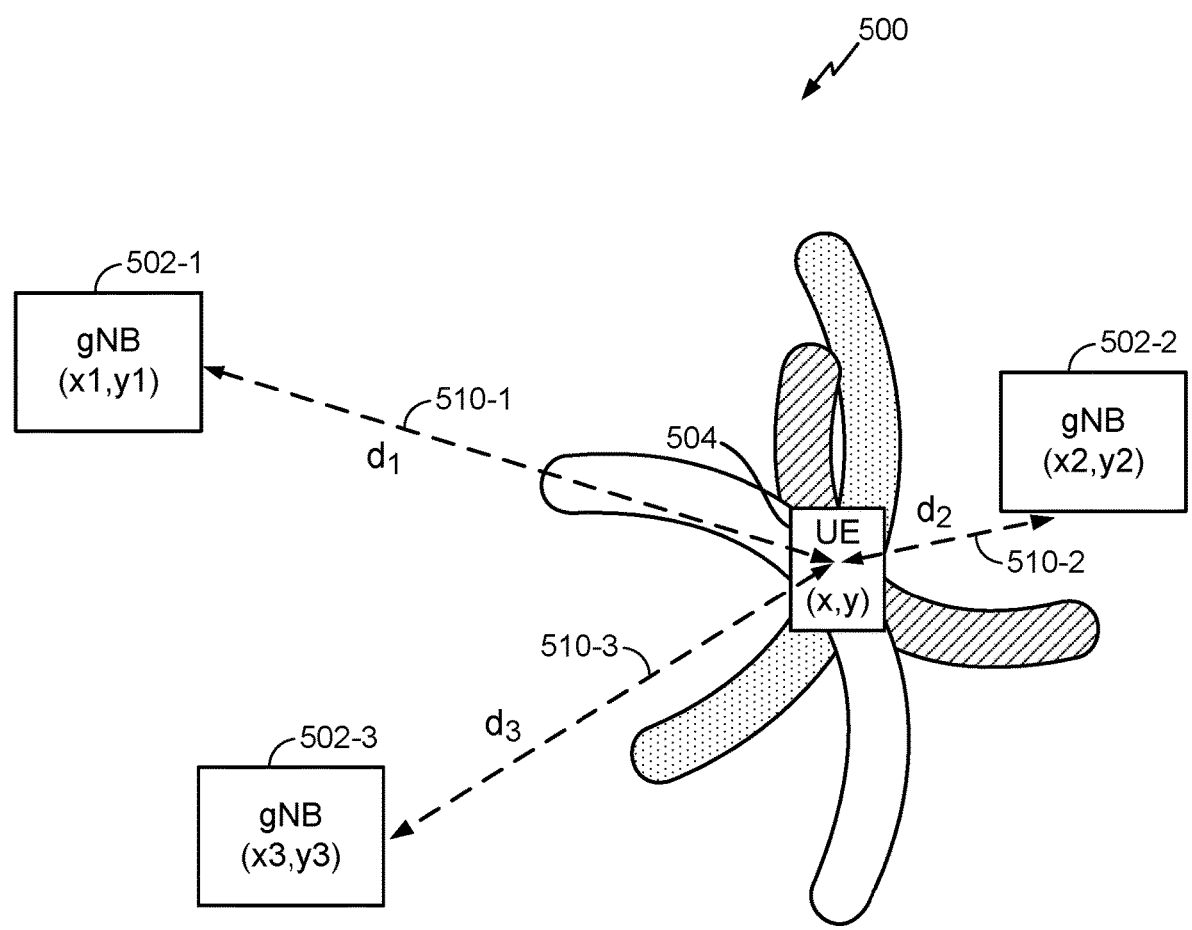
FIG. 5 is a diagram illustrating an exemplary technique for determining a position of a UE using information obtained from a plurality of base stations.

FIG. 5 illustrates an exemplary wireless communications system 500 according to aspects of the disclosure. In the example of FIG. 5, a UE 504 (which may correspond to any of the UEs described herein) is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 (collectively, base stations 502, and which may correspond to any of the base stations described herein) using RF signals and standardized protocols for the modulation of the RF signals and the exchange of information packets. By extracting different types of information from the exchanged RF signals, and utilizing the layout of the wireless communications system 500 (i.e., the base stations' locations, geometry, etc.), the UE 504 may determine its position, or assist in the determination of its position, in a predefined reference coordinate system. In an aspect, the UE 504 may specify its position using a two-dimensional coordinate system; however, the aspects disclosed herein are not so limited, and may also be applicable to determining positions using a three-dimensional coordinate system, if the extra dimension is desired. Additionally, while FIG. 5 illustrates one UE 504 and three base stations 502, as will be appreciated, there may be more UEs 504 and more base stations 502.

To support position estimates, the base stations 502 may be configured to broadcast reference RF signals (e.g., PRS, (NRS, CRS, TRS, CSI-RS, PSS, or SSS, etc.) to UEs 504 in their coverage area to enable a UE 504 to measure characteristics of such reference RF signals. For example, the UE 504 may measure the time of arrival (ToA) of specific reference RF signals (e.g., PRS, NRS, CRS, CSI-RS, etc.) transmitted by at least three different base stations 502-1, 502-2, and 502-3 and may use the RTT positioning method to report these ToAs (and additional information) back to the serving base station 502 or another positioning entity (e.g., location server 230, LMF 270).

In an aspect, although described as the UE 504 measuring reference RF signals from a base station 502, the UE 504 may measure reference RF signals from one of multiple cells supported by a base station 502. Where the UE 504 measures reference RF signals transmitted by a cell supported by a base station 502, the at least two other reference RF signals measured by the UE 504 to perform the RTT procedure would be from cells supported by base stations 502 different from the first base station 502 and may have good or poor signal strength at the UE 504.

In order to determine the position (x, y) of the UE 504, the entity determining the position of the UE 504 needs to know the locations of the base stations 502, which may be represented in a reference coordinate system as $(x_k, y_k)$, where k=1, 2, 3 in the example of FIG. 5. Where one of the base stations 502 (e.g., the serving base station) or the UE 504 determines the position of the UE 504, the locations of the involved base stations 502 may be provided to the serving base station 502 or the UE 504 by a location server with knowledge of the network geometry (e.g., location server 230, LMF 270). Alternatively, the location server may determine the position of the UE 504 using the known network geometry.

Either the UE 504 or the respective base station 502 may determine the distance 510 ($d_k$, where k=1, 2, 3) between the UE 504 and the respective base station 502. Specifically, the distance 510-1 between the UE 504 and base station 502-1 is $d_1$, the distance 510-2 between the UE 504 and base station 502-2 is $d_2$, and the distance 510-3 between the UE 504 and base station 502-3 is $d_3$. In an aspect, determining the RTT of signals exchanged between the UE 504 and any base station 502 can be performed and converted to a distance 510 ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 504 and the base stations 502 are the same. However, such an assumption may not be true in practice.

Once each distance 510 is determined, the UE 504, a base station 502, or the location server (e.g., location server 230, LMF 270) can solve for the position (x, y) of the UE 504 by using a variety of known geometric techniques, such as, for example, trilateration. From FIG. 5, it can be seen that the position of the UE 504 ideally lies at the common intersection of three semicircles, each semicircle being defined by radius $d_k$ and center $(x_k, y_k)$, where k=1, 2, 3.

In some instances, additional information may be obtained in the form of an AoA or AoD that defines a straight line direction (e.g., which may be in a horizontal plane or in three dimensions) or possibly a range of directions (e.g., for the UE 504 from the location of a base station 502). The intersection of the two directions at or near the point (x, y) can provide another estimate of the location for the UE 504.

A position estimate (e.g., for a UE 504) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 6A:
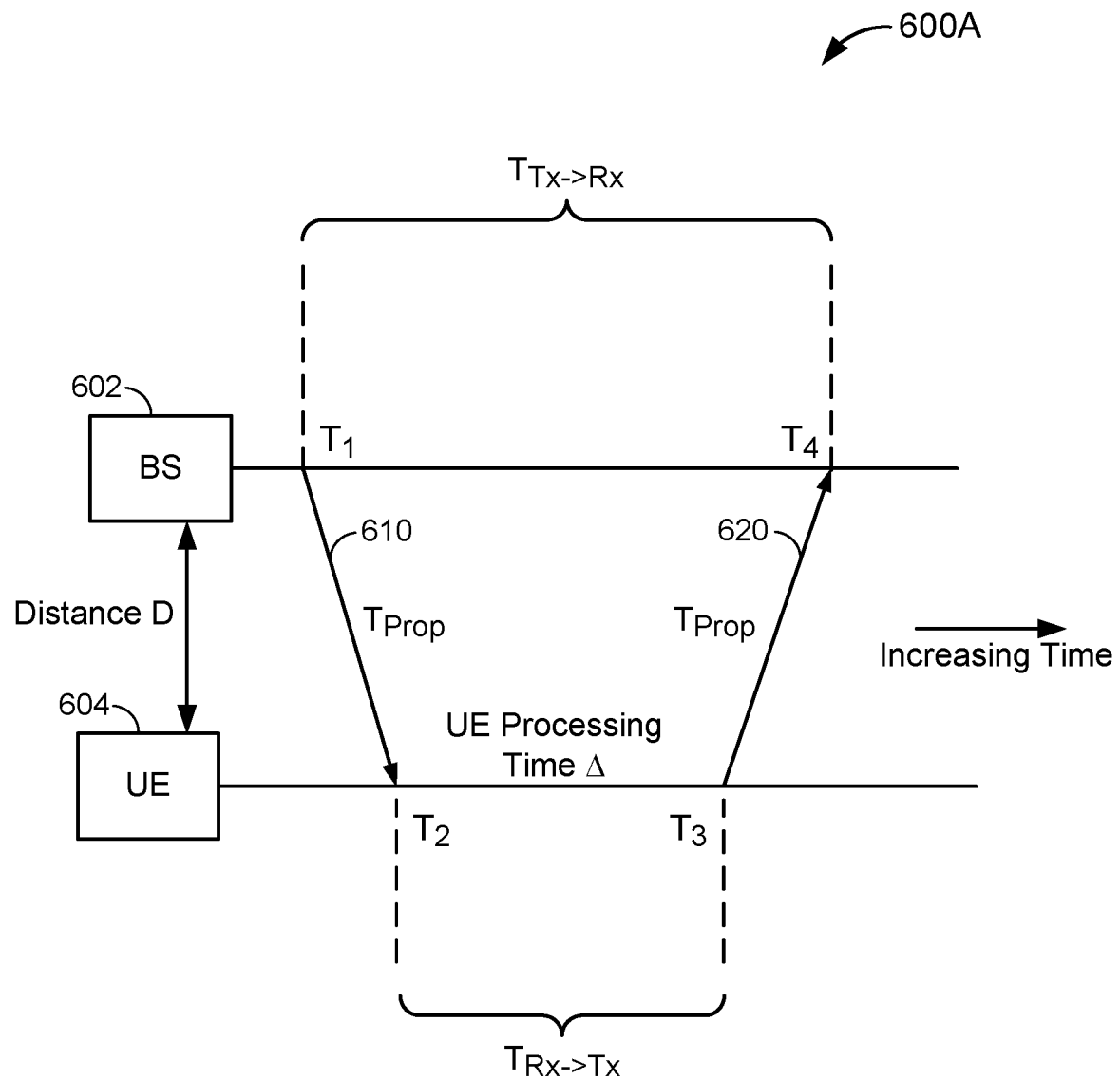
FIGS. 6A and 6B are diagrams showing exemplary timings of RTT measurement signals exchanged between a base station and a UE, according to aspects of the disclosure.

FIG. 6A is an exemplary diagram 600A showing exemplary timings of RTT measurement signals exchanged between a base station 602 (e.g., any of the base stations described herein) and a UE 604 (e.g., any of the UEs described herein), according to aspects of the disclosure. In the example of FIG. 6A, the base station 602 sends an RTT measurement signal 610 (e.g., PRS, NRS, CRS, CSI-RS, etc.) to the UE 604 at time $T_1$. The RTT measurement signal 610 has some propagation delay $T_{Prop}$ as it travels from the base station 602 to the UE 604. At time $T_2$ (the ToA of the RTT measurement signal 610 at the UE 604), the UE 604 receives/measures the RTT measurement signal 610. After some UE processing time, the UE 604 transmits an RTT response signal 620 at time $T_3$. After the propagation delay $T_{Prop}$, the base station 602 receives/measures the RTT response signal 620 from the UE 604 at time $T_4$ (the ToA of the RTT response signal 620 at the base station 602).

In order to identify the ToA (e.g., $T_2$) of an RF signal (e.g., an RTT measurement signal 610) transmitted by a given network node, the receiver (e.g., UE 604) first jointly processes all the resource elements (REs) on the channel on which the transmitter (e.g., base station 602) is transmitting the RF signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the RF signal. Generally, the receiver will use a noise-related quality threshold to filter out spurious local peaks, thereby presumably correctly identifying significant peaks on the channel. For example, the UE 604 may chose a ToA estimate that is the earliest local maximum of the CER that is at least X decibels (dB) higher than the median of the CER and a maximum Y dB lower than the main peak on the channel. The receiver determines the CER for each RF signal from each transmitter in order to determine the ToA of each RF signal from the different transmitters.

The RTT response signal 620 may explicitly include the difference between time $T_3$ and time $T_2$ (i.e., $T_{Rx \to Tx}$). Alternatively, it may be derived from the timing advance (TA), i.e., the relative UL/DL frame timing and specification location of UL reference signals. (Note that the TA is usually the RTT between the base station 602 and the UE 604, or double the propagation time in one direction.) Using this measurement and the difference between time $T_4$ and time $T_1$ (i.e., $T_{Tx \to Rx}$), the base station 602 can calculate the distance to the UE 604 as:

$$d = \frac{1}{2c}(T_{Tx \to Rx} - T_{Rx \to Tx}) = \frac{1}{2c}(T_2 - T_1) \mp \frac{1}{2c}(T_4 - T_3)$$

where c is the speed of light.

Figure 6B:
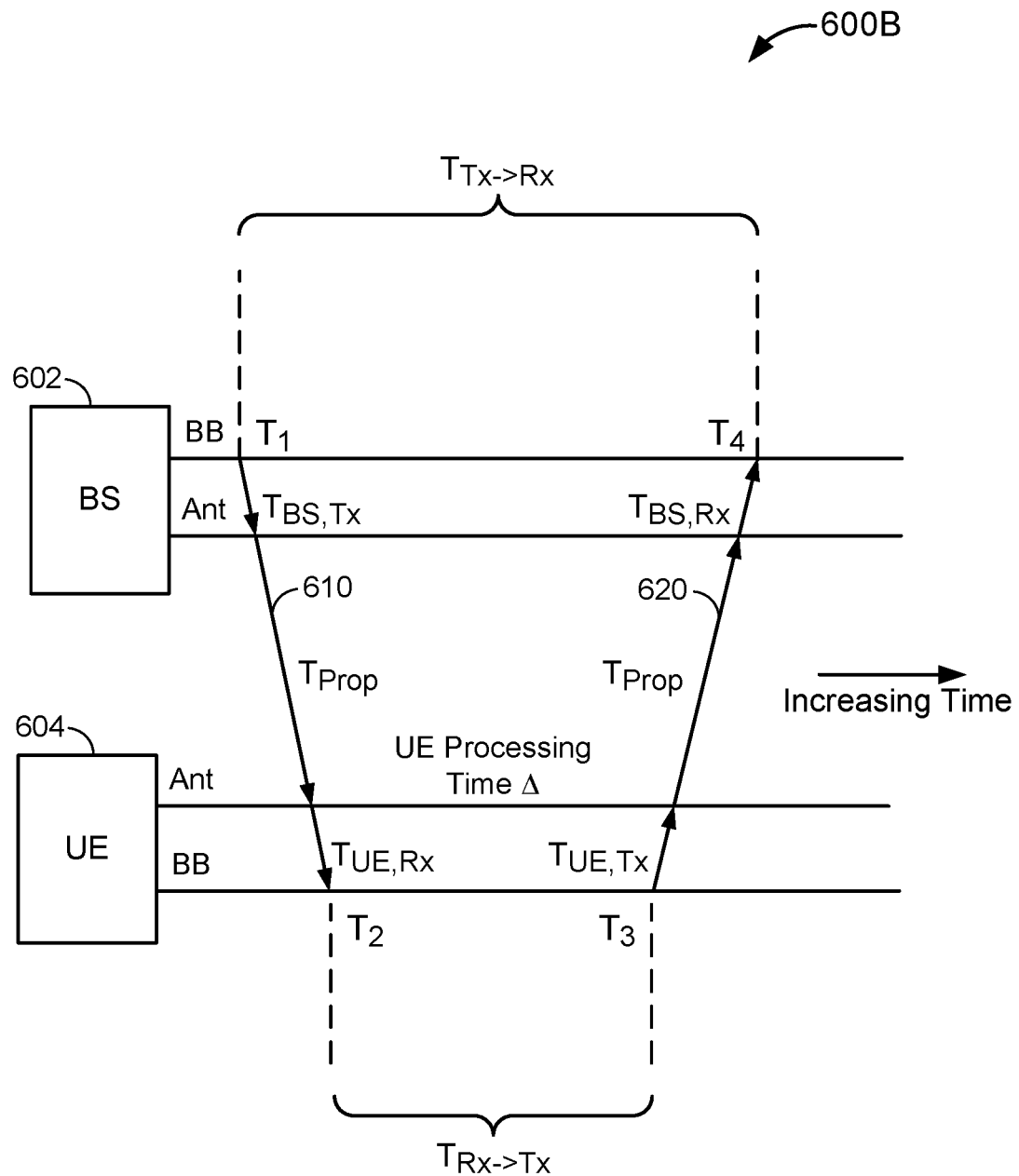

FIG. 6B is an exemplary diagram 600B showing exemplary timings of RTT measurement signals exchanged between the base station 602 and the UE 604, according to aspects of the disclosure. The diagram 600B is similar to the diagram 600A, except that it includes processing delays that occur at both the base station 602 and the UE 604 when transmitting and receiving the RTT measurement signal and RTT response signal.

Specifically, on the base station 602 side, there is a transmission delay of $T_{gNB,Tx}$ between the time the base station's 602 baseband (BB) generates the RTT measurement signal 610 and the antenna (Ant) transmits the RTT measurement signal 610. On the UE 604 side, there is a reception delay of $T_{UE,Rx}$ between the time the UE's 604 antenna receives/detects the RTT measurement signal 610 and the time the baseband processes the RTT measurement signal 610. Similarly, for the RTT response signal 620, there is a transmission delay of $T_{UE,Tx}$ between the time the UE's 604 baseband generates the RTT response signal 620 and the antenna transmits the RTT response signal 620. On the base station 602 side, there is a reception delay of $T_{gNB,Rx}$ between the time the base station's 602 antenna receives/detects the RTT response signal 620 and the time the baseband processes the RTT response signal 620.

Generally, the UE 604 calibrates its RF front end (RFFE) group delays and compensates for them so that the RTT report reflects the delay from its antennas. The base station 602 subtracts the calibrated RFFE group delays to determine the final distance between the base station 602 and the UE 604.

In NR, base stations (i.e., gNBs) are able to communicate wirelessly with each other, instead of only over a wired backhaul link, as in earlier cellular generations. While base stations generally use global positioning system (GPS) time for their system time, and are therefore coarsely synchronized, there are times when more precise synchronization would be beneficial, such as for positioning operations. As such, gNBs can use RTT procedures and the associated reference signals to calibrate the wireless network for location services. The present disclosure provides techniques for using RTT-based positioning procedures (1) to calibrate coordinate positions (relative and absolute) for reference nodes and (2) for synchronization of reference nodes. A "reference node" is any node used in the positioning of a target device (e.g., a UE or gNB) having an unknown position. A "node" may be a base station (macro or small cell), a cell/TRP supported by a base station, an antenna (array) of a base station, an RRH, and the like.

For some location services, such as geofencing, on-premise asset tracking, in-stadium navigation, etc., determining a position/location of a target device relative to one or more "landmarks" may be sufficient. A network that can provide absolute geographical accuracy may be expensive to deploy (in both time and technician cost). However, the translation from two nodes to the entire network based on relative positioning, as described herein, can reduce such a calibration effort. Further, network synchronization may be costly or difficult to implement due to the need for timing calibration at each node, which includes a need for accounting for other physical discrepancies (e.g., the speed-of-light through fiber) and fine-timing granularity for the common clock to synchronize positioning nodes.

Figure 7:
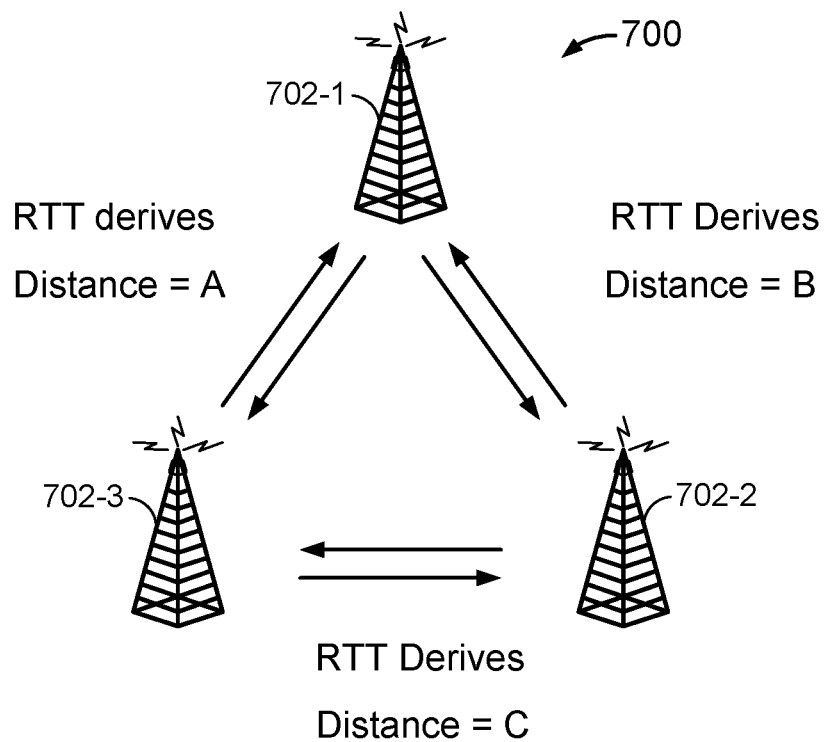
FIG. 7 illustrates an exemplary network in which three base stations perform RTT positioning procedures with each other to determine their relative locations, according to aspects of the disclosure.

Network calibration using RTT procedures begins by first determining the location/position of reference nodes. To determine the location of reference nodes, reference nodes participate in RTT procedures with each other to solve for their relative location. FIG. 7 illustrates an exemplary network 700 in which three base stations 702 (e.g., any of the base stations described herein capable of wireless communication with each other, such as any of the gNBs described herein) perform RTT positioning procedures with each other to determine their relative locations, according to aspects of the disclosure. Specifically, base stations 702-1 and 702-3 perform an RTT positioning procedure to derive distance A, base stations 702-1 and 702-2 perform an RTT positioning procedure to derive distance B, and base stations 702-2 and 702-3 perform an RTT positioning procedure to derive distance C. These three distances between the base stations 702-1 to 702-3 can provide (almost) unique relative location coordinates for the three base stations 702, as described further below.

Figure 8:
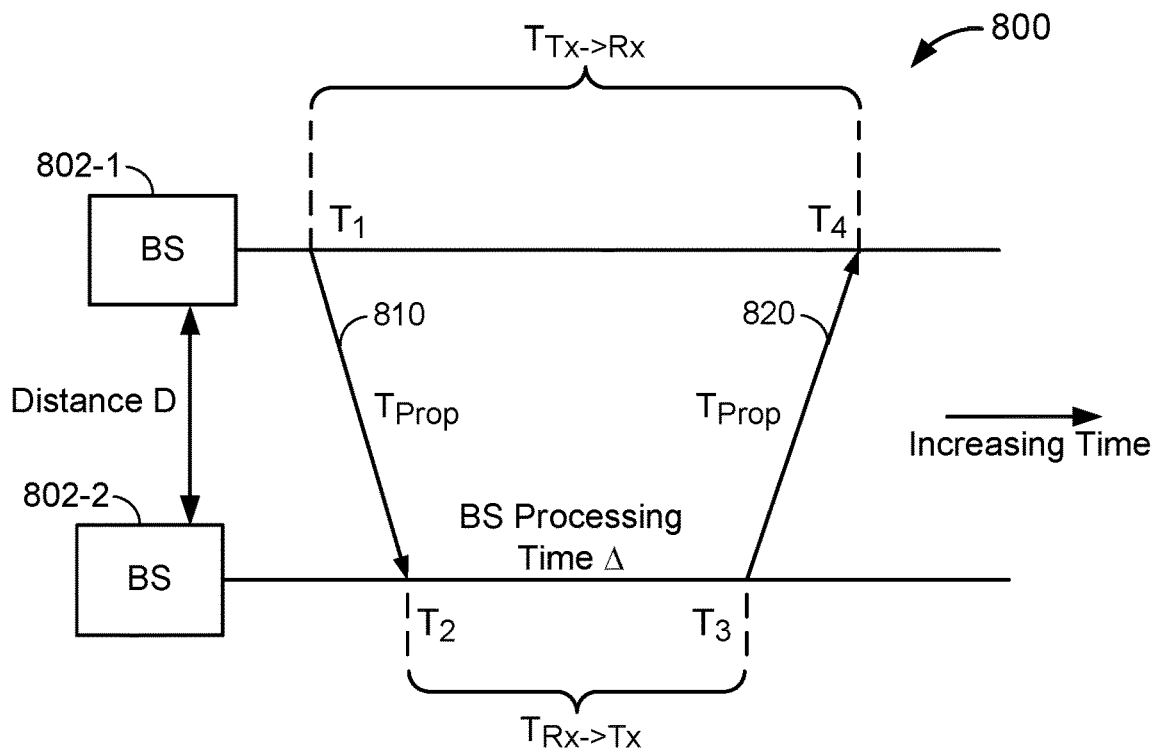
FIG. 8 is an exemplary diagram showing exemplary timings of RTT measurement signals exchanged between a first base station and a second base station, according to aspects of the disclosure.

FIG. 8 is an exemplary diagram 800 showing exemplary timings of RTT measurement signals exchanged between a first base station 802-1 (e.g., any of the base stations described herein capable of wireless communication with each other, such as any of the gNBs described herein) and a second base station 802-2 (e.g., any of the base stations described herein capable of wireless communication with each other, such as any of the gNBs described herein), according to aspects of the disclosure. In the example of FIG. 8, the first base station 802-1 sends an RTT measurement signal 810 (e.g., PRS, NRS, CRS, CSI-RS, etc.) to the second base station 802-2 at time $T_1$. The RTT measurement signal 810 has some propagation delay $T_{Prop}$ as it travels from the first base station 802-1 to the second base station 802-2. At time $T_2$ (the ToA of the RTT measurement signal 810 at the second base station 802-2), the second base station 802-2 receives/measures the RTT measurement signal 810. After some processing time, the second base station 802-2 transmits an RTT response signal 820 at time $T_3$. After the propagation delay $T_{Prop}$, the first base station 802-1 receives/measures the RTT response signal 820 from the second base station 802-2 at time $T_4$ (the ToA of the RTT response signal 820 at the first base station 802-1).

The RTT response signal 820 may explicitly include the difference between time $T_3$ and time $T_2$ (i.e., $T_{Rx \rightarrow Tx}$). Alternatively, it may be derived from the TA, i.e., the relative UL/DL frame timing and specification location of uplink reference signals. Using this measurement and the difference between time $T_4$ and time $T_1$ (i.e., $T_{Tx \rightarrow Rx}$), the first base station 802-1 (or location server 230, LMF 270) can calculate the distance to the second base station 802-2 as:

$$d = \frac{1}{2c}(T_{Tx \rightarrow Rx} - T_{Rx \rightarrow Tx}) = \frac{1}{2c}(T_2 - T_1) \mp \frac{1}{2c}(T_4 - T_3)$$

where c is the speed of light.

The network (e.g., location server 230, LMF 270) configures which of the two base stations 802 will be the initiator base station 802 (e.g., base station 802-1 in the example of FIG. 8) and which will be the responder base station 802 (e.g., base station 802-2 in the example of FIG. 8). Upon making this decision, the responder base station 802-2 can either act like a UE or act differently than a UE. If acting like a UE, the reference signal tracked by the responder base station 802-2 for ToA (e.g., RTT measurement signal 810) would be a downlink reference signal (e.g., DL PRS, CSI-RS, etc.) and the reference signal response (e.g., RTT response signal 820) would be an uplink reference signal (e.g., UL PRS, SRS, etc.). The measurement report from the responder base station 802-2 that reports the time $T_{Rx \rightarrow Tx}$ would be the same as a UE report.

If the responder base station 802-2 acts differently than a UE, the reference signal tracked by the responder base station 802-2 for ToA (e.g., RTT measurement signal 810) would again be a downlink reference signal (e.g., DL PRS, CSI-RS, etc.). However, the reference signal response (e.g., RTT response signal 820) would not be an uplink reference signal (e.g., UL PRS, SRS, etc.), but instead, another downlink reference signal (e.g., DL PRS, CSI-RS, etc.). The measurement report from the responder base station 802-2 that reports the time $T_{Rx \to Tx}$ would reflect the reference signal and associated identifiers.

In either case, the measurement report may also contain a timestamp (e.g., system frame number (SFN)) during which the measurement of the RTT measurement signal is valid, the reference signal received power (RSRP)/reference signal received quality (RSRQ) of the received reference signal, and/or the beam identifier, AoA of the beam carrying the reference signal, or AoD of the beam.

In an aspect, the responder base station 802-2 may be configured to support multi-beam operation. In that case, there may be multiple reference signal configurations for ToA tracking (i.e., the initiator base station 802-1 transmits the reference signal on a plurality of beams), and the responder base station 802-2 attempts to detect all of them. The responder base station 802-2 may also be configured with multiple reference signal configurations for the RTT response signal, and may sweep through all of them when transmitting the RTT response signal. In that case, the Rx-to-Tx time would be relative to the start of the sweep.

Figure 9:
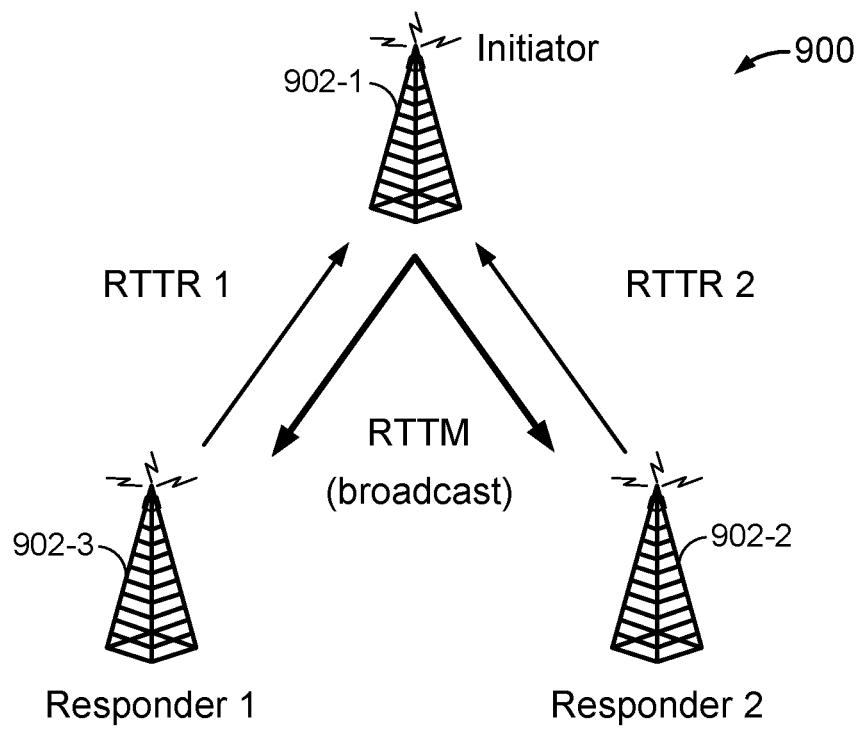
FIG. 9 illustrates an exemplary network in which an initiator base station performs an RTT procedure with two responder base stations, according to aspects of the disclosure.

In an aspect, an initiator base station may be able to support multiple simultaneous responses from multiple responder base station. FIG. 9 illustrates an exemplary network 900 in which an initiator base station 902-1 performs an RTT procedure with two responder base stations 902-2 and 902-3, according to aspects of the disclosure. As illustrated in FIG. 9, the initiator base station 902-1 can trigger multiple RTT responses by broadcasting an RTT measurement signal, as opposed to unicasting the RTT measurement signal as in the examples above. The network (e.g., location server 230) can configure the recipient/responder base stations (base stations 902-2 and 902-3 in FIG. 9) to search for and respond to the broadcasted RTT measurement signal from the initiator base station 902-1.

The multiple RTT responses from the responder base stations 902-2 and 902-3 can be multiplexed. For example, orthogonal resource allocation can be pre-configured (which is contention free), or non-orthogonal multiplexing with different scrambling can be used (which necessitates contention procedures, such as CCA). The latter may use random selection or random activation from the pre-configuration. Note that the recipient/responder base stations 902-2 and 902-3 only respond if they hear the broadcasted RTT measurement signal from the initiator base station 902-1.

Figure 10:
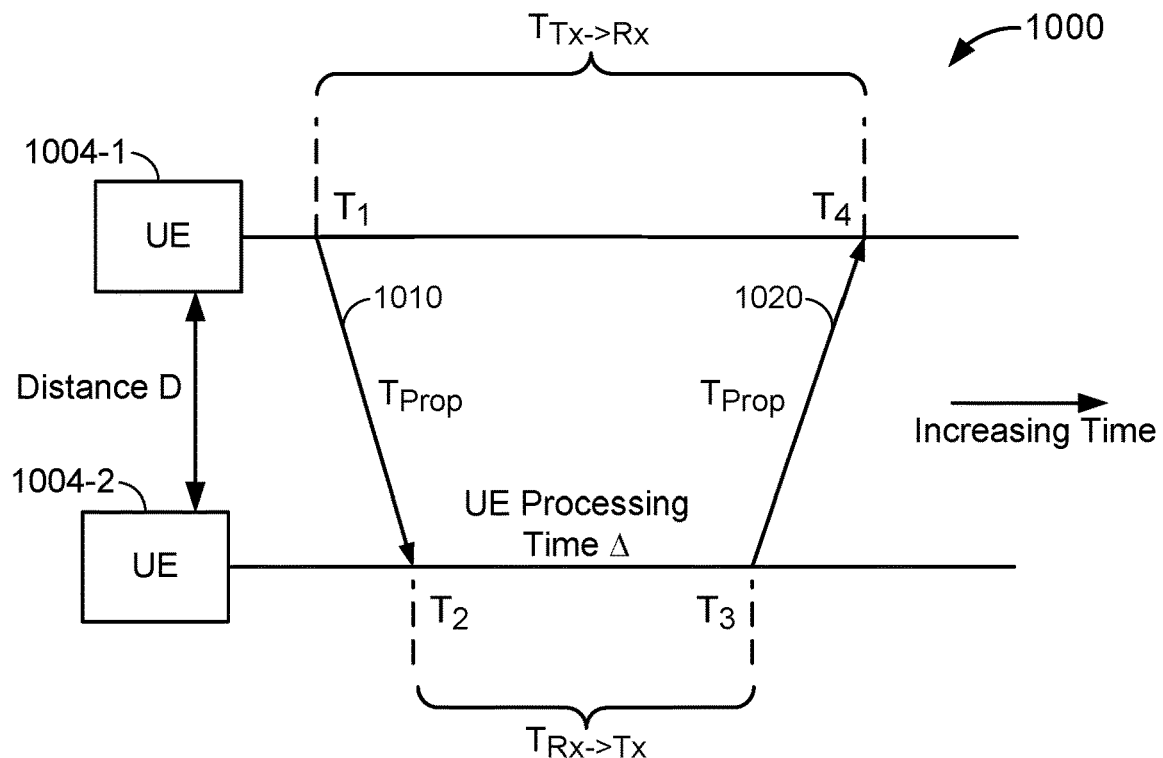
FIG. 10 is an exemplary diagram showing exemplary timings of RTT measurement signals exchanged between a first UE and a second, according to aspects of the disclosure.

The present disclosure further provides techniques for performing RTT procedures between UEs. In NR, UEs send/receive reference signals to "sense" the presence of other UEs and thereby prevent interfering with them. This communication of reference signals can be leveraged to enable UEs to perform RTT procedures with other UEs without having to explicitly establish a wireless connection (e.g., Bluetooth®, LTE Direct, etc.) with them. FIG. 10 is an exemplary diagram 1000 showing exemplary timings of RTT measurement signals exchanged between a first UE 1004-1 and a second UE 1004-2, according to aspects of the disclosure. In the example of FIG. 10, the first UE 1004-1 sends an RTT measurement signal 1010 (e.g., PRS, NRS, CRS, CSI-RS, etc.) to the second UE 1004-2 at time $T_1$. The RTT measurement signal 1010 has some propagation delay $T_{Prop}$ as it travels from the first UE 1004-1 to the second UE 1004-2. At time $T_2$ (the ToA of the RTT measurement signal 1010 at the second UE 1004-2), the second UE 1004-2 receives/measures the RTT measurement signal 1010. After some processing time, the second UE 1004-2 transmits an RTT response signal 1020 at time $T_3$. After the propagation delay $T_{Prop}$, the first UE 1004-1 receives/measures the RTT response signal 1020 from the second UE 1004-2 at time $T_4$ (the ToA of the RTT response signal 1020 at the first UE 1004-1).

The RTT response signal 1020 may explicitly include the difference between time $T_3$ and time $T_2$ (i.e., $T_{Rx \to Tx}$). Alternatively, it may be derived from the TA, i.e., the relative UL/DL frame timing and specification location of uplink reference signals. Using this measurement and the difference between time $T_4$ and time $T_1$ (i.e., $T_{Tx \to Rx}$), the first UE 1004-1 (or location server 230, LMF 270) can calculate the distance to the second UE 1004-2 as:

$$d = \frac{1}{2c}(T_{Tx \to Rx} - T_{Rx \to Tx}) = \frac{1}{2c}(T_2 - T_1) - \frac{1}{2c}(T_4 - T_3)$$

where c is the speed of light.

The network (e.g., location server 230, LMF 270) configures which of the two UEs 1004 will be the initiator UE 1004 (e.g., UE 1004-1 in the example of FIG. 10) and which will be the responder UE 1004 (e.g., UE 1004-2 in the example of FIG. 10). Upon making this decision, the initiator UE 1004-1 can either act like a base station or act differently than a base station. If acting like a base station, the reference signal tracked by the responder UE 1004-2 for ToA (e.g., RTT measurement signal 1010) would be a downlink reference signal (e.g., DL PRS, CSI-RS, etc.) and the reference signal response (e.g., RTT response signal 1020) would be an uplink reference signal (e.g., UL PRS, SRS, etc.). The measurement report from the responder UE 1004-2 that reports the time $T_{Rx \to Tx}$ would be the same as a typical UE report.

If the initiator UE 1004-1 acts differently than a base station, the reference signal tracked by the responder UE 1004-2 for ToA (e.g., RTT measurement signal 1010) would again be a downlink reference signal (e.g., DL PRS, CSI-RS, etc.). However, the reference signal response (e.g., RTT response signal 1020) would not be an uplink reference signal (e.g., UL PRS, SRS, etc.), but instead, another downlink reference signal (e.g., DL PRS, CSI-RS, etc.). The measurement report from the responder UE 1004-2 that reports the time $T_{Rx \to Tx}$ would reflect the reference signal and associated identifiers.

In either case, the measurement report may also contain a timestamp (e.g., SFN) during which the measurement of the RTT measurement signal is valid, the RSRP/RSRQ of the received reference signal, and/or the beam identifier, AoA of the beam on which the reference signal is transmitted, or AoD of the beam.

In an aspect, the responder UE 1004-2 may be configured to support multi-beam operation. In that case, there may be multiple reference signal configurations for ToA tracking (i.e., the initiator UE 1004-1 transmits the reference signal on a plurality of beams), and the responder UE 1004-2 attempts to detect all of them. The responder UE 1004-2 may also be configured with multiple reference signal configurations for the RTT response signal, and may sweep through all of them when transmitting the RTT response signal. In that case, the Rx-to-Tx time would be relative to the start of the sweep.

Figure 11A:
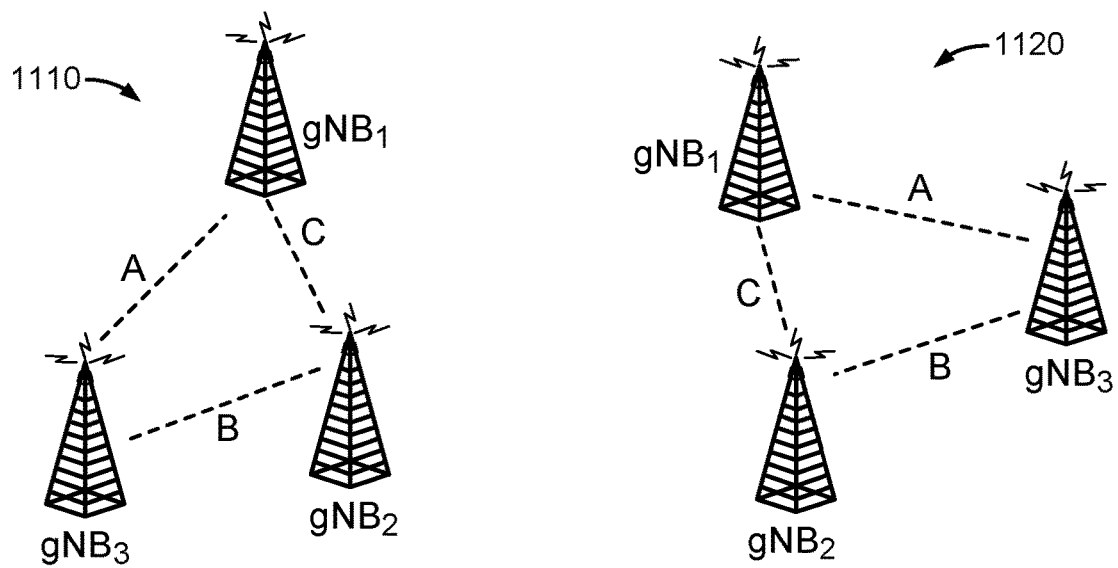
FIG. 11A illustrates exemplary relative positions of three base stations, according to aspects of the disclosure.

The present disclosure further provides techniques for disambiguating the relative positions of nodes. Referring back to FIG. 7, there are two candidate configurations satisfying the distances A, B, and C between the base stations 702-1 to 702-3 in FIG. 7. Specifically, the third base station (e.g., base station 702-1 in FIG. 7) may be on the left or right of the axis between the other two base stations (e.g., base stations 702-2 and 702-3 in FIG. 7). FIG. 11A illustrates exemplary relative positions of three base stations, according to aspects of the disclosure. The first candidate configuration is shown in FIG. 11A as network layout 1110, in which a third base station labelled "gNB 3," (e.g., base station 702-1 in FIG. 7) is on the left side of the axis between a first base station labelled "gNB 1," (e.g., base station 702-3 in FIG. 7) and a second base station labelled "gNB 2" (e.g., base station 702-2 in FIG. 7). The second candidate configuration is shown in FIG. 11A as network layout 1120, in which the third base station "gNB 3" is on the right side of the "gNB 1"-to-"gNB 2" axis.

The network (e.g., location server 230, LMF 270) may employ a priori deployment information (e.g., knowledge that the third node cannot be on one side or the other of the axis between the other two nodes) or additional measurements, such as AoA/AoD of reference signals sent/received between the nodes, to determine which of these relative layouts (network layout 1110 or 1120) applies.

Figure 11B:
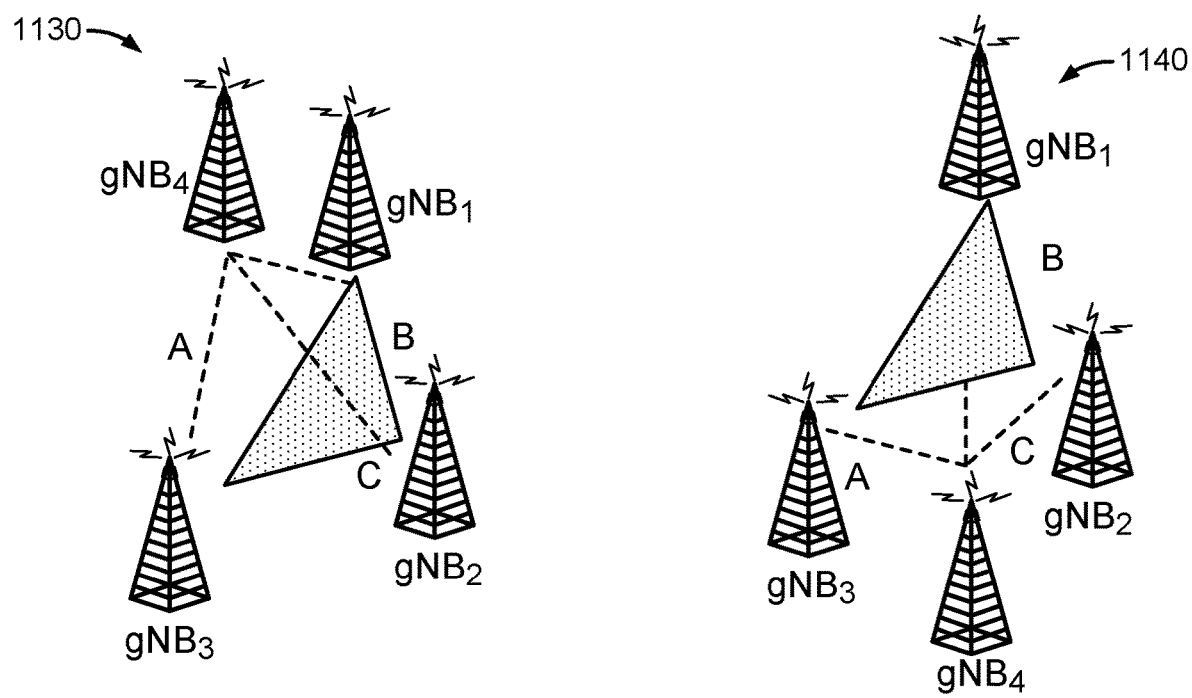
FIG. 11B illustrates exemplary relative positions of four base stations, according to aspects of the disclosure.

When there are only three reference nodes, each node is located on the same plane as the other nodes. However, when there are four or more reference nodes, the fourth and subsequent nodes will not necessarily lie on the same plane as the first three nodes. Specifically, the fourth reference node may be located below or above the plane defined by the positions of the first three reference nodes, as illustrated in FIG. 11B. Specifically, FIG. 11B illustrates exemplary relative positions of four base stations (e.g., any of the base stations described herein), according to aspects of the disclosure. The first candidate configuration is shown in FIG. 11B as network layout 1130, in which a fourth base station labelled "gNB 4" is above the plane defined by three other base stations labelled "gNB 1," "gNB 2," and "gNB 3." The second candidate configuration is shown in FIG. 11B as network layout 1140, in which the fourth base station "gNB 4" is below the plane defined by "gNB 1," "gNB 2," and "gNB 3."

The network (e.g., location server 230, LMF 270) may employ a priori deployment information (e.g., knowledge that the fourth node cannot be on one side or the other of the plane defined by the other three nodes) or additional measurements, such as AoA/AoD of reference signals sent/received between the nodes, to determine which of these relative layouts applies.

The techniques described above can be performed among any number of reference nodes to determine the relative locations of the reference nodes with respect to each other in two-dimensional (three nodes) or three-dimensional (four or more nodes) space. Once the relative positions of all of the reference nodes in the network are known, the absolute position of the nodes may be translated to the network. This can be accomplished if there is at least one reference node with a known absolute position and that is capable of determining the orientation of the AoA/AoD of reference signals in an absolute grid. Alternatively, this can be accomplished if the absolute position of at least two reference nodes is known (in which case there is no need for knowledge of the AoA/AoD of reference signals).

Figure 12:
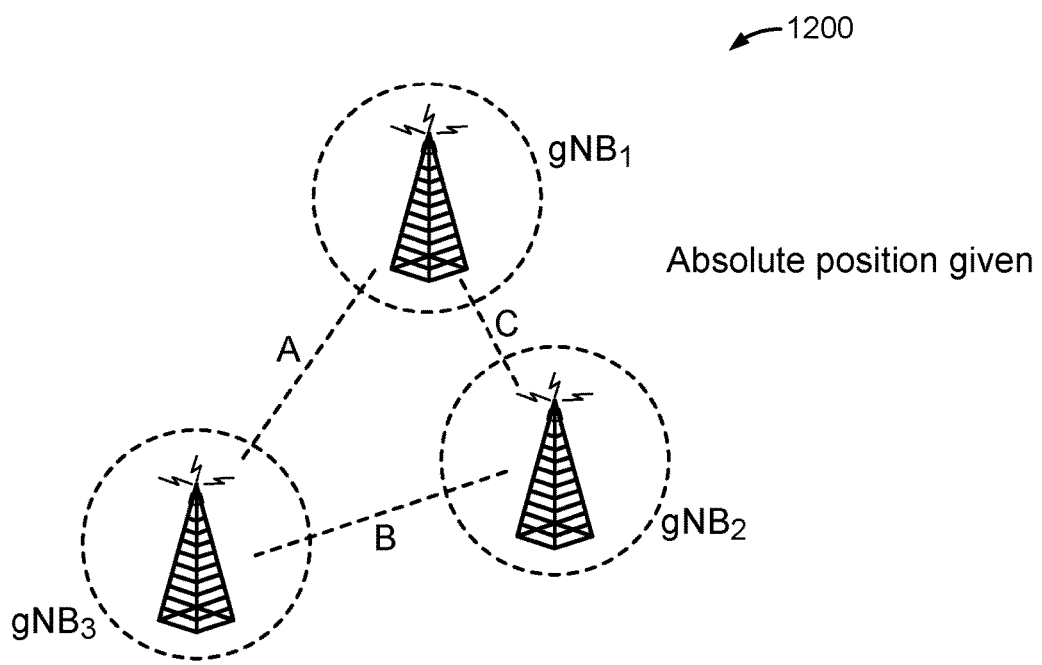
FIG. 12 illustrates an exemplary network in which the absolute locations of two reference nodes is known and can be used to determine the location of a third reference node, according to aspects of the disclosure.

FIG. 12 illustrates an exemplary network 1200 in which the absolute locations of two reference nodes is known and can be used to determine the location of a third reference node, according to aspects of the disclosure. Specifically, the absolute locations of a first base station labelled "gNB 1" and a second base station labelled "gNB 2" are known, and using the distances A, B, and C between the base stations (determined from RTT procedures), the absolute location of a third base station labelled "gNB 3" can be determined using known mathematical techniques.

An additional consideration of using RTT positioning procedures to calibrate reference nodes in a wireless network is that calibration procedures may need higher precision than the normal positioning provided by RTT techniques. To address this issue, wider bandwidths may be employed, including carrier aggregation (CA), and/or more complicated measurements can be taken, such as carrier-phase tracking. In addition, error propagation can be alleviated by performing a joint solution across multiple reference nodes using RTT measurements across all possible connections, as illustrated in FIG. 13.

Figure 13:
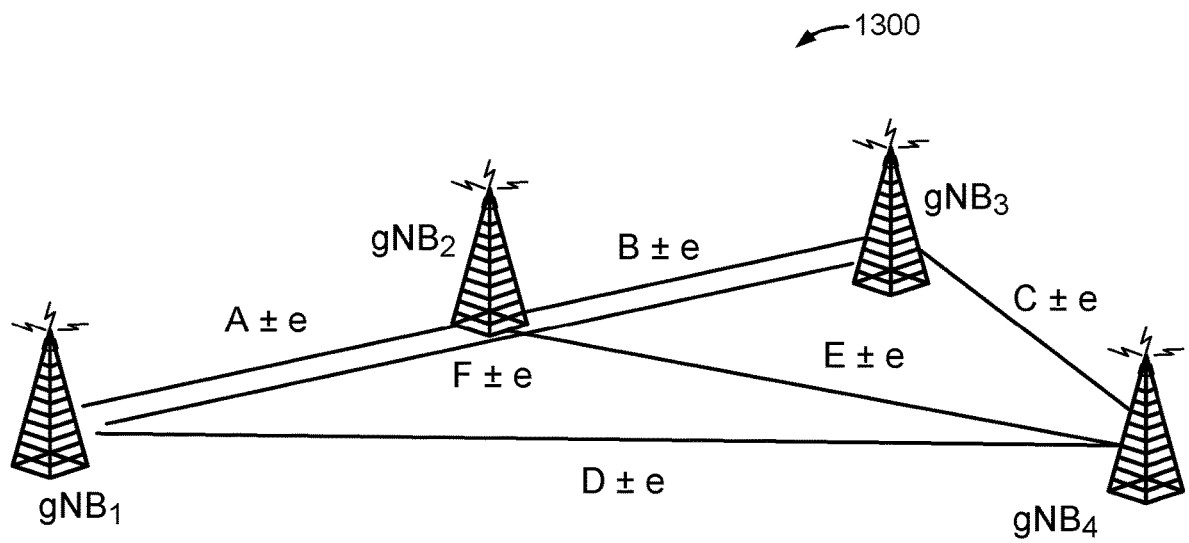
FIG. 13 illustrates an exemplary network of four reference nodes in which each reference node has calculated a distance between itself and the remaining nodes, according to aspects of the disclosure.

Specifically, FIG. 13 illustrates an exemplary network 1300 of four reference nodes (illustrated as base stations) in which each reference node has calculated a distance between itself and the remaining nodes, according to aspects of the disclosure. These distances are represented as distances "A" to "F," and each has some associated error "e." By performing an RTT procedure with each other reference node in the network 1300, a reference node can eliminate the cumulative error associated with multiple paths between nodes, resulting in a single error ("e" in FIG. 13) for each distance calculation.

For example, to estimate the distance between $gNB_1$ and $gNB_3$. To do this, there are two RTT procedures, one to determine the distance "A" (via the RTT between $gNB_1$ and $gNB_2$) and one to determine the distance "B" (via the RTT between $gNB_2$ and $gNB_3$). Then, if the error in the distance "A" is "e" and the error in the distance "B" is also "e," then the error of the link between $gNb_1$ and $gNB_3$ would typically be "2e." However, since $gNB_1$, $gNb_2$, and $gNB_3$ already transmit and receive RTT signals, those signals can be used to derive a separate independent measurement/distance "F" between $gNB_1$ and $gNb_3$, without having to use the two separate distances "A" and "B" as proxies. In the case that the distance "F" is calculated directly, the error in the distance "F" is only "e," as opposed to "2e" for the distance "A" plus "B."

As will be appreciated, this type of joint solution, one using distances "A" and "B" as proxies to obtain the distance "F," and one estimating the distance "F" directly by exploiting the RTT signals that are already being transmitted to estimate distances "A" and "B," is merely an example. In other words, all gNBs transmit and receive RTT signals, and therefore distance estimates can be calculated across all possible connections, which helps to reduce errors by the fact that the connections/distances in a network are related to each other according to physical space constraints/deployment constraints, etc.

The present disclosure further provides techniques for using RTT-based positioning procedures for synchronization of reference nodes. Synchronization sources may not be sufficiently accurate for nanosecond (ns) and sub-ns timing. For example, GPS timing is on the order of 50-100 ns and time sensitive networking (TSN), which defines a set of IEEE standards primarily developed for Ethernet, is on the order of microseconds (µs). However, greater timing precision may be needed for wireless positioning procedures, which rely on very precise time measurements to provide accurate results. There are also architectural challenges in distributing a centralized system clock time through a network, such as cable calibration delays (even with the trigger traveling through cable or fiber at the speed of light). That is, even sending a synchronization signal at the speed of light, there are propagation delays in relaying the signal that should be addressed. There are also technician installation and measurement costs; positioning solutions may not be able to scale if intensive installation is needed per site.

To address these issues, the present disclosure provides techniques to allow reference nodes to report the difference between what the expected ToA of a reference signal would be if the network were time-synchronized and the actual/observed ToA of the reference signal. Note that the propagation time $T_{Prop}$ between reference nodes can be achieved through existing RTT procedures (deployment information regarding node locations can be further incorporated if available).

Figure 14:
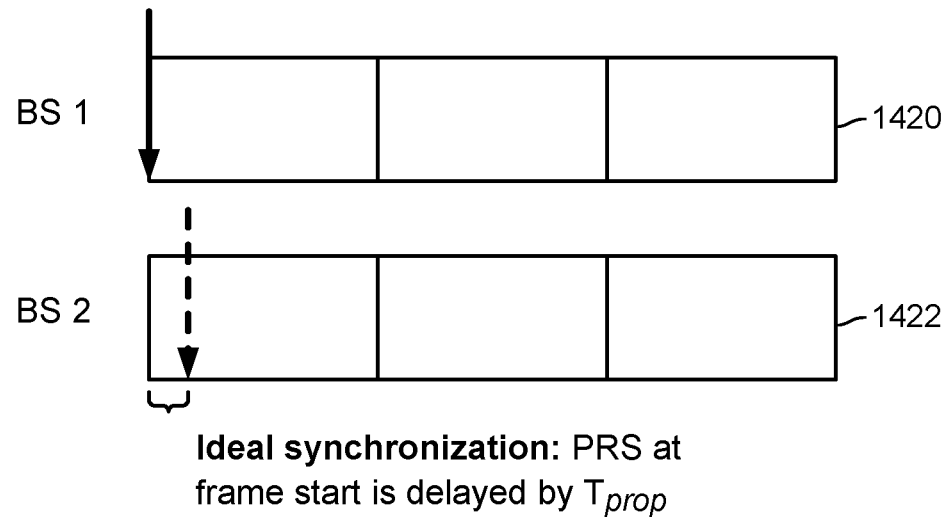
FIGS. 14, 15A and 15B show frame sequences illustrating exemplary techniques for enabling network synchronization using RTT procedures, according to aspects of the disclosure.
Figure 14:
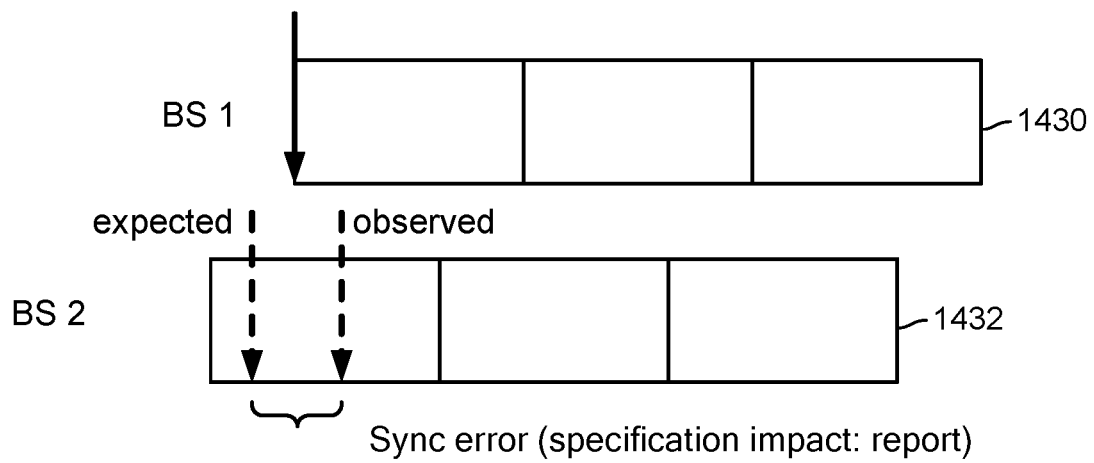

FIG. 14 illustrates exemplary techniques for enabling network synchronization using RTT procedures, according to aspects of the disclosure. The propagation delay $T_{Prop}$ can then be used to deduce the relative timing for frame (or subframe or slot) boundaries between a first base station (labelled "gNB 1") and a second base station (labelled "gNB 2"). As illustrated by frame sequences 1420 and 1422, when there is ideal synchronization between the base stations, the first base station transmits a reference RF signal at the beginning of a subframe and the second base station receives the reference RF signal after the propagation delay $T_{Prop}$. However, when there is imperfect synchronization, as illustrated by frame sequences 1430 and 1432, the observed time of arrival of a reference RF signal may occur before or after the propagation delay $T_{Prop}$ from the start of a subframe. In that case, the second base station can shift the start of its subframe timing such that the start of a subframe occurs $T_{Prop}$ before or after the reference RF signal was received. In addition, the second base station can report the discrepancy between the observed ToA and the expected ToA. Note that although frame sequences 1420, 1422, 1430, and 1432 have been described as sequences of frames, they may instead be sequences of subframes or slots.

There are three approaches to synchronization disclosed herein. First, a master node may report the expected ToA, second, a slave node determines the expected ToA, and third, the master node provides a timing advance command to the slave node. In the first approach, the master node sends the expected ToA for the reference signals relative to a frame boundary (using previous RTT measurement for $T_{prop}$) to the slave node. The slave node then measures the observed ToA of the reference signal and re-aligns its frame boundary so that the observed ToA will align with the expected TOA (if repeated).

Figure 15A:
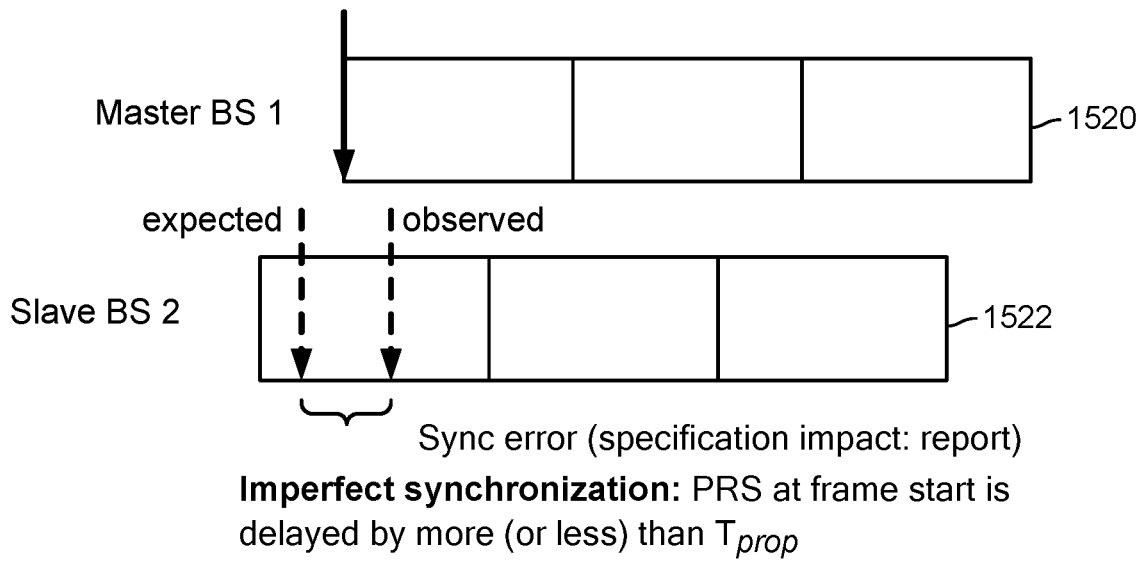

Referring now to the second approach, in which the slave node determines the expected ToA, the master node (or the location server 230, LMF 270) sends configuration information (e.g., on which OFDM symbol the reference signal is being transmitted) to the slave node for the position of the reference signal relative to a frame boundary. The slave node determines the expected ToA relative to the frame boundary (using previous RTT measurements for $T_{prop}$, i.e., the delay from the end of the configured OFDM symbol to the start of reception of the reference signal) and measures the observed ToA. The slave node then re-aligns the frame boundary so that the observed ToA will align with the expected TOA. The first and second approaches are illustrated in FIG. 15A by frame sequences 1520 and 1522. Frame sequences 1520 and 1522 are similar to frame sequences 1430 and 1432 in FIG. 14, except that the base station "gNB 1" in FIG. 14 would be the base station labelled "master gNB 1" and the base station "gNB 2" in FIG. 14 would be the base station labelled "slave gNB 2," respectively, in FIG. 15A.

Figure 15B:
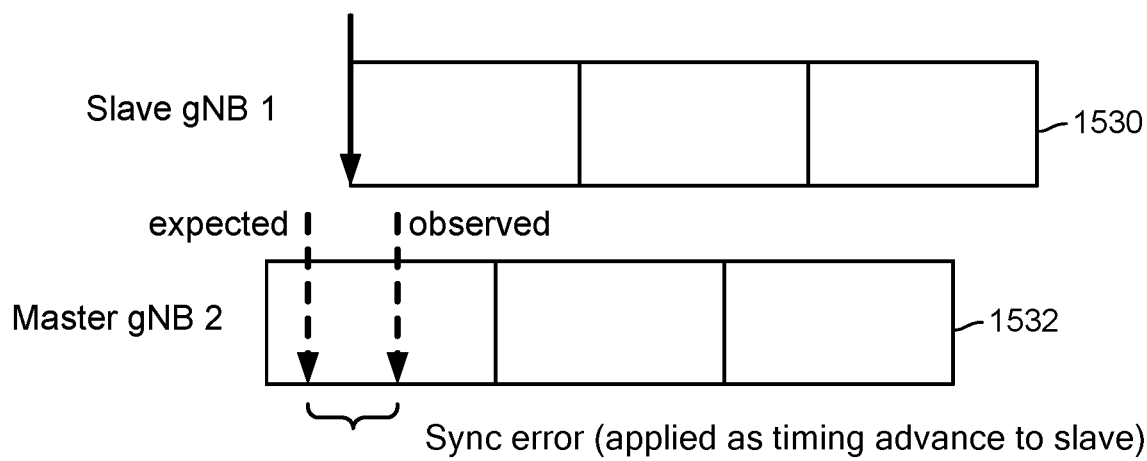

In the third approach, in which the master node provides a timing advance command to the slave node, the slave node first sends a reference signal for the master node to track. Specifically, the master node tracks the ToA for the reference signal relative to a frame boundary (using previous RTT measurement for $T_{prop}$), which should ideally equal $T_{prop}$. However, it may not (where the network is unsynchronized), and the master node sends a timing advance to the slave node based on the actual/observed ToA measurement. This is illustrated in FIG. 15B by frame sequences 1530 and 1532. Frame sequences 1530 and 1532 are similar to frame sequences 1430 and 1432 in FIG. 14, except that the base station "gNB 1" in FIG. 14 would now be the base station labelled "slave gNB 1" and the base station "gNB 2" in FIG. 14 would now be the base station labeled "master gNB 2." Note that although frame sequences 1520, 1522, 1530, and 1532 have been described as sequences of frames, they may instead be sequences of subframes or slots.

Note that the frame boundaries of the frame sequences 1430 and 1432 in FIGS. 14 and 1520, 1522, 1530, and 1532 in FIGS. 15A and 15B are not aligned because the network is unsynchronized, whereas the frame boundaries of the frame sequences 1420 and 1422 are aligned because the network is synchronized in that example. That is, in a synchronized network, the nodes' system clocks are synchronized such that the start of a frame at each node occurs at precisely the same time (or within some very small time threshold). Also note that the slave node does not need to physically realign its frame timing to match that of the master node. Rather, it can simply determine the synchronization error and use it for any future communications with the master node (e.g., adjusting the timing of transmissions to account for the synchronization error, removing the synchronization error from the timing of received reference signals, etc.).

There are various considerations that should be taken into account for acknowledgments and triggering RTT procedures. Regarding RTT triggers, reference nodes may be configured by the network as a master or a slave. Slave nodes are configured to look for particular reference RTT measurement signals and reference signals for synchronization. Slave reference nodes may be triggered to listen through over-the-air (OTA) or backhaul messages. Layer 1 (L1) messages that may be used as a trigger include a medium access control (MAC) control element (CE) or a dedicated radio network temporary identifier (RNTI) for triggering the physical downlink control channel (PDCCH) or physical downlink shared channel (PDSCH).

Regarding acknowledgments, timing re-alignment completion by slave nodes may be communicated through OTA messages (e.g., a response to the master node) or backhaul messages (e.g., a response to the master node or a location server). The slave node may send a response reference signal that should have a ToA at the master node delayed by $T_{prop}$ relative to frame boundaries for the slave node (in the case of the first two approaches described above with reference to FIGS. 15A and 15B). The master node then has knowledge of whether to re-trigger.

By both utilizing the same wireless communications protocol (e.g., LTE, NR), the master and slave nodes share the same frame timing. That is, they both use the same length of frames, subframes, slots, etc. The local clocks of the master and slave nodes may be generally synchronized (e.g., to GPS time), and therefore the frame boundaries may be generally aligned, but not sufficiently for the purposes of positioning operations, which rely on a high-degree of timing precision. As such, the synchronization procedures described herein are especially beneficial for positioning operations.

Figure 16:
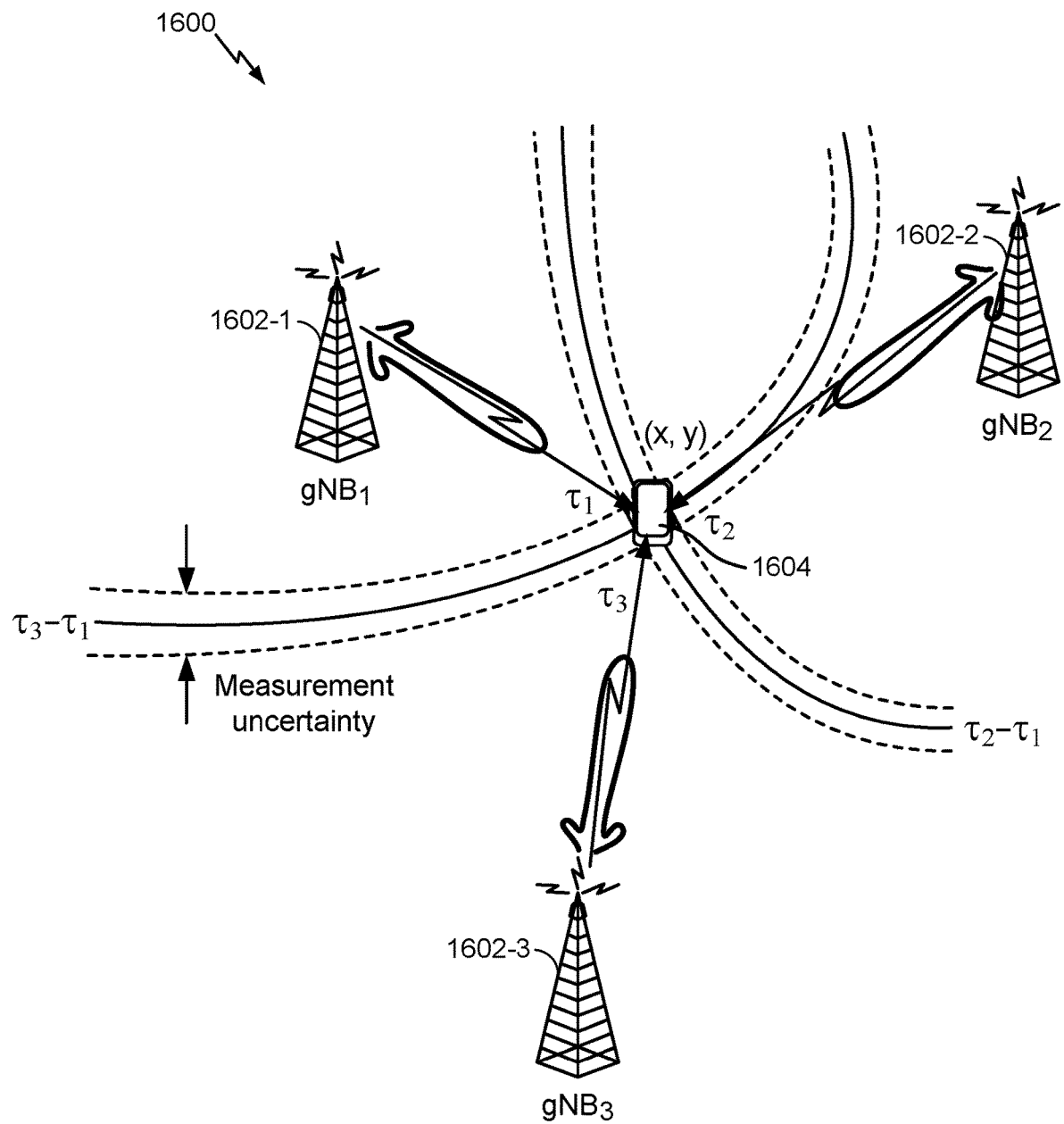
FIG. 16 is a diagram illustrating an exemplary technique for determining a position of a mobile device using information obtained from a plurality of base stations.

The RTT synchronization techniques described herein can further be used to enable time difference of arrival (TDOA) techniques for positioning UEs. FIG. 16 illustrates an exemplary wireless communications system 1600 according to various aspects of the disclosure. In the example of FIG. 16, a UE 1604 (e.g., any of the UEs described herein) is attempting to calculate an estimate of its position, or assist another entity (e.g., a base station or core network component, another UE, a location server, a third party application, etc.) to calculate an estimate of its position. The UE 1604 may communicate wirelessly with a plurality of base stations 1602-1, 1602-2, and 1602-3 (collectively, base stations 1602, and which may correspond to any of the base stations described herein) using RF signals and standardized protocols for the modulation of the RF signals and the exchange of information packets. By extracting different types of information from the exchanged RF signals, and utilizing the layout of the wireless communications system 1600 (i.e., the base stations locations, geometry, etc.), the UE 1604 may determine its position, or assist in the determination of its position, in a predefined reference coordinate system. In an aspect, the UE 1604 may specify its position using a two-dimensional coordinate system; however, the aspects disclosed herein are not so limited, and may also be applicable to determining positions using a three-dimensional coordinate system, if the extra dimension is desired. Additionally, while FIG. 16 illustrates one UE 1604 and three base stations 1602, as will be appreciated, there may be more UEs 1604 and more base stations 1602.

To support position estimates, the base stations 1602 may be configured to broadcast reference RF signals (e.g., PRS, CRS, CSI-RS, synchronization signals, etc.) to UEs 1604 in their coverage area to enable a UE 1604 to measure characteristics of such reference RF signals. For example, the observed time difference of arrival (OTDOA) positioning method, defined by the 3rd Generation Partnership Project (3GPP) for wireless networks that provide wireless access using 5G NR, is a multilateration method in which the UE 1604 measures the time difference, known as a reference signal time difference (RSTD), between specific reference RF signals (e.g., PRS, CRS, CSI-RS, etc.) transmitted by different pairs of network nodes (e.g., base stations 1602, antennas of base stations 1602, etc.) and either reports these time differences to a location server, such as the location server 230 or LMF 270, or computes a location estimate itself from these time differences.

Generally, RSTDs are measured between a reference network node (e.g., base station 1602-1 in the example of FIG. 16) and one or more neighbor network nodes (e.g., base stations 1602-2 and 1602-3 in the example of FIG. 16). The reference network node remains the same for all RSTDs measured by the UE 1604 for any single positioning use of OTDOA and would typically correspond to the serving cell for the UE 1604 or another nearby cell with good signal strength at the UE 1604. In an aspect, where a measured network node is a cell supported by a base station, the neighbor network nodes would normally be cells supported by base stations different from the base station for the reference cell and may have good or poor signal strength at the UE 1604. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

The UE 1604 can measure and (optionally) report the RSTDs between reference RF signals received from pairs of base stations 1602. Using the RSTD measurements, the known absolute or relative transmission timing of each base station 1602, and the known position(s) of the transmitting antennas for the reference and neighboring base stations 1602, the UE's 1604 position may be calculated (e.g., by the UE 1604, the serving base station 1602, or the location server 230/LMF 270). More particularly, the RSTD for a neighbor base station "k" relative to a reference network node "Ref" may be given as $(ToA_k - ToA_{Ref})$, where the ToA values may be measured modulo one subframe duration (1 ms) to remove the effects of measuring different subframes at different times. In the example of FIG. 16, the measured time differences between the reference cell of base station 1602-1 and the neighboring cells of base stations 1602-2 and 1602-3 are represented as $\tau_2 - \tau_1$ and $\tau_3 - \tau_1$, where $\tau_1$, $\tau_2$, and $\tau_3$ represent the ToA of a reference RF signal from the transmitting antenna(s) of base station 1602-1, 1602-2, and 1602-3, respectively.

The UE 1604 may then convert the ToA measurements for different base stations 1602 to RSTD measurements and (optionally) send them to the positioning entity. An RSTD measurement may be represented as:

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 1604 position may be determined.

UTDOA is a similar positioning method to OTDOA, but is based on uplink reference RF signals transmitted by the UE 1604 (e.g., SRS). Further, transmission and/or reception beamforming at the network node and/or UE 1604 can enable wideband bandwidth at the cell edge for increased precision. Beam refinements may also leverage channel reciprocity procedures in NR.

Unlike RTT positioning techniques, TDOA positioning techniques rely on tight network synchronization across base stations 1602 so that time differences can be attributed largely to distance differences. This may be prohibitive when very high precision is needed.

The present disclosure further provides techniques for "on-the-fly" synchronization using the RTT positioning procedures described herein to enable the use of TDOA positioning procedures. A serving base station (e.g., a gNB) can initiate an RTT procedure with each neighbor base station (e.g., other gNBs) involved in a TDOA procedure with a given UE prior to the TDOA procedure (whether downlink- or uplink-based). As a first option, the application of timing synchronization alignment, as discussed above with reference to FIGS. 14, 15A, and 15B, can be applied physically. For example, all of the base stations involved in the TDOA positioning procedure could shift their frame timing to align with the slave node. As a second option, the application of timing synchronization alignment can be applied logically, that is, only for the correction of positioning reports. That is, the digital frame capture windows and the processing time are not shifted; rather, only the positioning calculations are shifted. This option can apply to the processing of PRS at a UE (for OTDOA) or SRS at a base station (for UTDOA).

Figure 17:
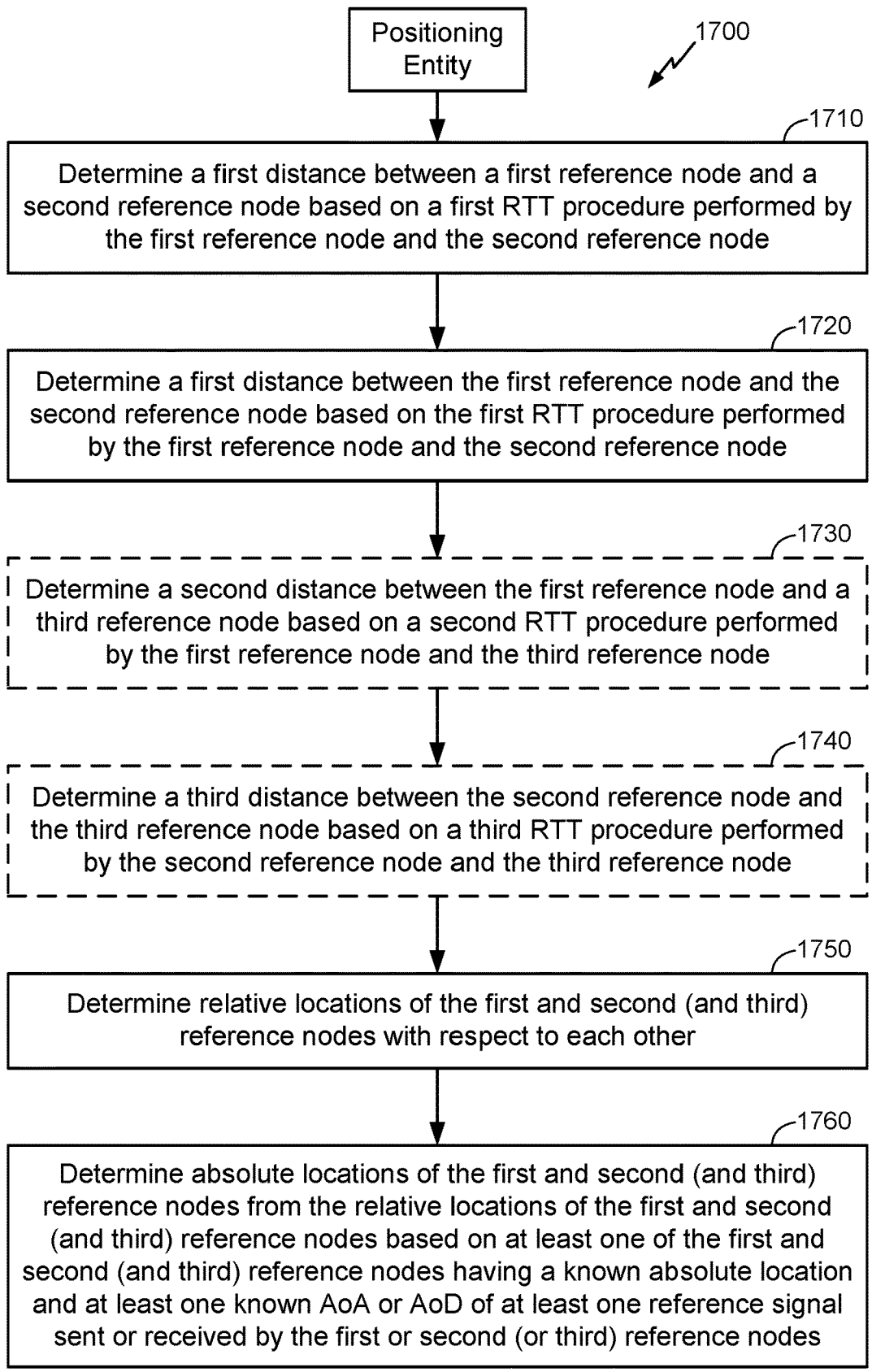
FIG. 17 illustrates an exemplary method of determining locations of reference nodes in a wireless network using RTT, according to aspects of the disclosure.

FIG. 17 illustrates an exemplary method 1700 of determining locations of reference nodes in a wireless communications network using RTT, according to aspects of the disclosure. The method 1700 may be performed by a positioning entity (e.g., a (serving) base station, location server, etc.).

At 1710, the positioning entity transmits a request (or instruction) to a first reference node (e.g., base station 702-1 in FIG. 7) to perform a first RTT procedure with a second reference node (e.g., base station 702-2 in FIG. 7). In an aspect, where the positioning entity is a base station, operation 1710 may be performed by communication device 314, processing system 334, memory component 340, and/or positioning module 348, any or all of which may be considered means for performing this operation. Where the positioning entity is a network entity, operation 1710 may be performed by communication device 326, processing system 336, memory component 342, and/or positioning module 358, any or all of which may be considered means for performing this operation.

At 1720, the positioning entity determines a first distance (e.g., distance B in FIG. 7) between the first reference node and the second reference node based on the first RTT procedure performed by the first reference node and the second reference node. In an aspect, at least one of the first reference node and the second reference node transmits a beamformed reference signal to the other of the first reference node and the second reference node as part of the first RTT procedure. In an aspect, where the positioning entity is a base station, operation 1720 may be performed by communication device 314, processing system 334, memory component 340, and/or positioning module 348, any or all of which may be considered means for performing this operation. Where the positioning entity is a network entity, operation 1710 may be performed by communication device 326, processing system 336, memory component 342, and/or positioning module 358, any or all of which may be considered means for performing this operation.

At 1730, the positioning entity optionally determines a second distance (e.g., distance A in FIG. 7) between the first reference node and a third reference node (e.g., base station 702-3 in FIG. 7) based on a second RTT procedure performed by the first reference node and the third reference node. In an aspect, where the positioning entity is a base station, operation 1720 may be performed by communication device 314, processing system 334, memory component 340, and/or positioning module 348, any or all of which may be considered means for performing this operation. Where the positioning entity is a network entity, operation 1720 may be performed by communication device 326, processing system 336, memory component 342, and/or positioning module 358, any or all of which may be considered means for performing this operation.

At 1740, the positioning entity optionally determines a third distance (e.g., distance C in FIG. 7) between the second reference node and the third reference node based on a third RTT procedure performed by the second reference node and the third reference node. In an aspect, where the positioning entity is a base station, operation 1730 may be performed by communication device 314, processing system 334, memory component 340, and/or positioning module 348, any or all of which may be considered means for performing this operation. Where the positioning entity is a network entity, operation 1730 may be performed by communication device 326, processing system 336, memory component 342, and/or positioning module 358, any or all of which may be considered means for performing this operation.

At 1750, the positioning entity determines relative locations of the first and second reference nodes with respect to each other, as discussed above with reference to FIGS. 11A and 11B. If operations 1730 and 1740 were performed, the positioning entity can also determine a relative location of the third reference node with respect to the relative locations of the first and second reference nodes. In an aspect, where the positioning entity is a base station, operation 1740 may be performed by communication device 314, processing system 334, memory component 340, and/or positioning module 348, any or all of which may be considered means for performing this operation. Where the positioning entity is a network entity, operation 1740 may be performed by communication device 326, processing system 336, memory component 342, and/or positioning module 358, any or all of which may be considered means for performing this operation.

At 1760, the positioning entity determines absolute locations of the first and second reference nodes from the relative locations of the first and second reference nodes based on at least one of the first and second reference nodes having a known absolute location and at least one known AoA or AoD of at least one reference signal sent or received by the first or second reference nodes, as discussed above with reference to FIG. 12. If operations 1730 and 1740 were performed, the positioning entity can also determine an absolute location of the third reference node from the relative locations of the first, second, and third reference nodes based on (1) the at least one of the first and second reference nodes having the known absolute location and at least one known AoA or AoD of at least one reference signal sent or received by the first, second, or third reference nodes, or (2) the first and second reference nodes having known absolute locations. In an aspect, where the positioning entity is a base station, operation 1750 may be performed by communication device 314, processing system 334, memory component 340, and/or positioning module 348, any or all of which may be considered means for performing this operation. Where the positioning entity is a network entity, operation 1750 may be performed by communication device 326, processing system 336, memory component 342, and/or positioning module 358, any or all of which may be considered means for performing this operation.

Operations 1730 and 1740 are optional because there may only be one reference node that needs to be located, and it can be located based on the known absolute location of another reference node and the known AoA or AoD of at least one reference signal sent or received by the first or second reference nodes, as described with reference to operation 1760.

Figure 18:
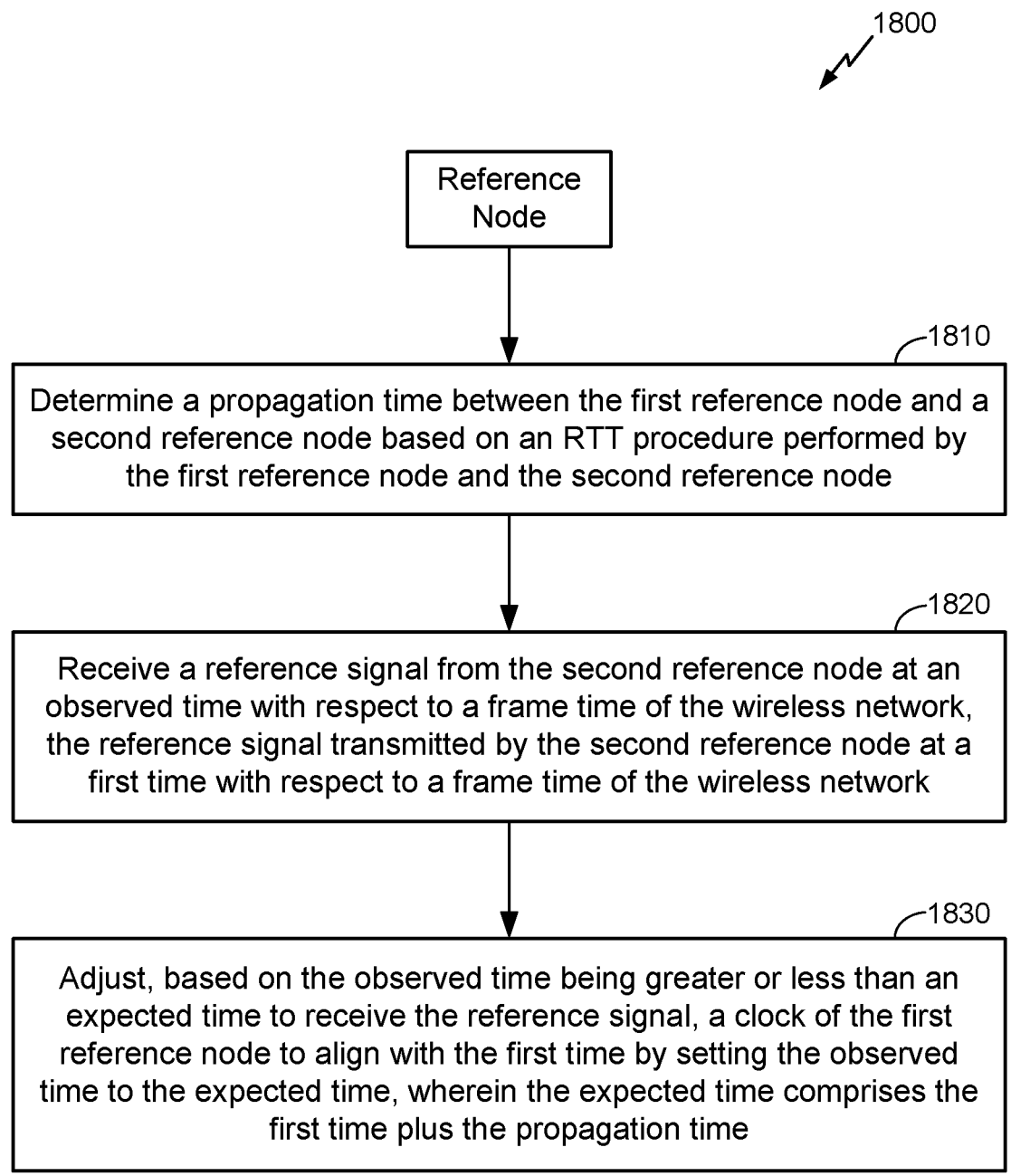
FIG. 18 illustrates an exemplary method of synchronizing reference nodes in a wireless network using RTT, according to aspects of the disclosure.

FIG. 18 illustrates an exemplary method 1800 of synchronizing reference nodes in a wireless communications network using RTT, according to aspects of the disclosure. The method 1800 may be performed by a first reference node (e.g., a base station or a UE).

At 1810, the first reference node determines a propagation time between the first reference node and a second reference node (e.g., a base station, UE, etc.) based on an RTT procedure performed by the first reference node and the second reference node. In an aspect, where the reference node is a base station, operation 1810 may be performed by communication device 314, processing system 334, memory component 340, and/or positioning module 348, any or all of which may be considered means for performing this operation. Where the reference node is a UE, operation 1810 may be performed by communication device 308, processing system 332, memory component 338, and/or positioning module 344, any or all of which may be considered means for performing this operation.

At 1820, the first reference node receives a reference signal (e.g., an RTT measurement signal) from the second reference node at an observed time with respect to a frame time of the wireless network, the reference signal transmitted by the second reference node at a first time with respect to the frame time of the wireless network, as discussed above with reference to FIGS. 14 and 15. In an aspect, where the reference node is a base station, operation 1820 may be performed by receiver 318, processing system 334, memory component 340, and/or positioning module 348, any or all of which may be considered means for performing this operation. Where the reference node is a UE, operation 1820 may be performed by receiver 312, processing system 332, memory component 338, and/or positioning module 344, any or all of which may be considered means for performing this operation.

At 1830, the first reference node adjusts, based on the observed time being greater or less than an expected time to receive the reference signal, a clock of the first reference node to align with the first time by setting the observed time to the expected time, wherein the expected time comprises the first time plus the propagation time, as discussed above with reference to FIGS. 14 and 15. In an aspect, where the reference node is a base station, operation 1830 may be performed by communication device 314, processing system 334, memory component 340, and/or positioning module 348, any or all of which may be considered means for performing this operation. Where the reference node is a UE, operation 1830 may be performed by communication device 308, processing system 332, memory component 338, and/or positioning module 344, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, an field programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of determining locations of reference nodes in a wireless network, comprising:
   transmitting a request to a first reference node to perform a first round-trip-time (RTT) procedure with a second reference node, wherein the first reference node and the second reference node are not time synchronized with respect to each other;
   determining a first distance between the first reference node and the second reference node based on the first RTT procedure performed by the first reference node and the second reference node, wherein at least one of the first reference node and the second reference node transmits a beamformed reference signal to the other of the first reference node and the second reference node as part of the first RTT procedure;
   determining a second distance between the first reference node and a third reference node based on a second RTT procedure performed by the first reference node and the third reference node;
   determining a third distance between the second reference node and the third reference node based on a third RTT procedure performed by the second reference node and the third reference node;
   determining relative locations of the first and second reference nodes with respect to each other;
   determining a relative location of the third reference node with respect to the relative locations of the first and second reference nodes; and
   determining absolute locations of the first, second, and third reference nodes from the relative locations of the first, second, and third reference nodes based on (1) the first reference node, the second reference node, or both having a known absolute location and at least one known angle-of-arrival (AoA) or angle-of-departure (AoD) of at least one reference signal sent or received by the first, second, or third reference nodes, or (2) the first and second reference nodes having known absolute locations.

2. The method of claim 1, wherein the relative locations of the first, second, and third reference nodes are based on network deployment information associated with at least one of the first, second, and third reference nodes.

3. The method of claim 1, wherein the method is performed by the first reference node.

4. The method of claim 3, wherein the first reference node performs the first and second RTT procedures with the second and third reference nodes, respectively.

5. The method of claim 4, wherein the determining the third distance comprises receiving the third distance from the second reference node or the third reference node.

6. The method of claim 4, wherein the determining the third distance comprises:
   receiving an RTT between the second reference node and the third reference node from the second reference node or the third reference node; and
   calculating the third distance based on the RTT time between the second reference node and the third reference node.

7. The method of claim 3, wherein the determining the first distance comprises:
   sending an RTT measurement signal to the second reference node at a first time, wherein the RTT measurement signal is received at the second reference node at a second time;
   receiving an RTT response signal from the second reference node at a fourth time, the RTT response signal sent by the second reference node at a third time, the RTT response signal including a first time difference between the second time and the third time;
   determining a second time difference between the first time and the fourth time;
   calculating a propagation time between the first reference node and the second reference node based on a difference between the first time difference and the second time difference; and
   determining the first distance between the first reference node and the second reference node based on the propagation time.

8. The method of claim 7, wherein the RTT measurement signal comprises a positioning reference signal (PRS), a navigation reference signal (NRS), a cell-specific reference signal (CRS), a tracking reference signal (TRS), a channel state information reference signal (CSI-RS), a primary synchronization signal (PSS), or a secondary synchronization signal (SSS).

9. The method of claim 3, wherein an RTT response signal from the second reference node during the first RTT procedure and an RTT response signal from the third reference node during the second RTT procedure are multiplexed.

10. The method of claim 9, wherein the RTT response signal from the second reference node and the RTT response signal from the third reference node are multiplexed onto orthogonal resources or non-orthogonal resources with different frequency scrambling.

11. The method of claim 9, wherein the second reference node only transmits the RTT response signal if the second reference node receives an RTT measurement signal from the first reference node, and the third reference node only transmits the RTT response signal if the third reference node receives the RTT measurement signal from the first reference node.

12. The method of claim 1, wherein the method is performed by a location server.

13. The method of claim 12, wherein:
   the determining the first distance comprises receiving the first distance from the first reference node or the second reference node,
   the determining the second distance comprises receiving the second distance from the first reference node or the third reference node, and
   the determining the third distance comprises receiving the third distance from the second reference node or the third reference node.

14. The method of claim 12, wherein the determining the first distance comprises:
   receiving an RTT between the first reference node and the second reference node from the first reference node or the second reference node; and
   calculating the first distance based on the RTT time between the first reference node and the second reference node.

15. The method of claim 1, wherein the first, second, and third reference nodes are the same type of network node.

16. The method of claim 1, wherein the first, second, and third reference nodes comprise base stations.

17. The method of claim 1, wherein the third reference node is not time synchronized with respect to the first reference node and the second reference node.

18. An apparatus, comprising:
a memory;
a communication device; and
at least one processor, the at least one processor configured to:
cause the communication device to transmit a request to a first reference node to perform a first round-trip-time (RTT) procedure with a second reference node, wherein the first reference node and the second reference node are not time synchronized with respect to each other;
determine a first distance between the first reference node and the second reference node based on the RTT procedure performed by the first reference node and the second reference node, wherein at least one of the first reference node and the second reference node transmits a beamformed reference signal to the other of the first reference node and the second reference node as part of the first RTT procedure;
determine a second distance between the first reference node and a third reference node based on a second RTT procedure performed by the first reference node and the third reference node;
determine a third distance between the second reference node and the third reference node based on a third RTT procedure performed by the second reference node and the third reference node;
determine relative locations of the first and second reference nodes with respect to each other;
determine a relative location of the third reference node with respect to the relative locations of the first and second reference nodes; and
determine absolute locations of the first, second, and third reference nodes from the relative locations of the first, second, and third reference nodes based on (1) the first reference node, the second reference node or both having a known absolute location and at least one known angle-of-arrival (AoA) or angle-of-departure (AoD) of at least one reference signal sent or received by the first, second, or third reference nodes, or (2) the first and second reference nodes having known absolute locations.

19. The apparatus of claim 18, wherein the relative locations of the first, second, and third reference nodes are based on network deployment information associated with at least one of the first, second, and third reference nodes.

20. The apparatus of claim 18, wherein the apparatus is the first reference node.

21. The apparatus of claim 20, wherein the first reference node performs the first and second RTT procedures with the second and third reference nodes, respectively.

22. The apparatus of claim 21, wherein the at least one processor being configured to determine the third distance comprises the at least one processor being configured to receive the third distance from the second reference node or the third reference node.

23. The apparatus of claim 21, wherein the at least one processor being configured to determine the third distance comprises the at least one processor being configured to:
receive an RTT between the second reference node and the third reference node from the second reference node or the third reference node; and
calculate the third distance based on the RTT time between the second reference node and the third reference node.

24. The apparatus of claim 20, wherein the at least one processor being configured to determine the first distance comprises the at least one processor being configured to:
cause the communication device to send an RTT measurement signal to the second reference node at a first time, wherein the RTT measurement signal is received at the second reference node at a second time;
receive, via the communication device, an RTT response signal from the second reference node at a fourth time, the RTT response signal sent by the second reference node at a third time, the RTT response signal including a first time difference between the second time and the third time;
determine a second time difference between the first time and the fourth time;
calculate a propagation time between the first reference node and the second reference node based on a difference between the first time difference and the second time difference; and
determine the first distance between the first reference node and the second reference node based on the propagation time.

25. The apparatus of claim 24, wherein the RTT measurement signal comprises a positioning reference signal (PRS), a navigation reference signal (NRS), a cell-specific reference signal (CRS), a tracking reference signal (TRS), a channel state information reference signal (CSI-RS), a primary synchronization signal (PSS), or a secondary synchronization signal (SSS).

26. The apparatus of claim 20, wherein an RTT response signal from the second reference node during the first RTT procedure and an RTT response signal from the third reference node during the second RTT procedure are multiplexed.

27. The apparatus of claim 26, wherein the RTT response signal from the second reference node and the RTT response signal from the third reference node are multiplexed onto orthogonal resources or non-orthogonal resources with different frequency scrambling.

28. The apparatus of claim 26, wherein the second reference node only transmits the RTT response signal if the second reference node receives an RTT measurement signal from the first reference node, and the third reference node only transmits the RTT response signal if the third reference node receives the RTT measurement signal from the first reference node.

29. The apparatus of claim 18, wherein the apparatus is a location server.

30. The apparatus of claim 29, wherein:
the at least one processor being configured to determine the first distance comprises the at least one processor being configured to receive, via the communication device, the first distance from the first reference node or the second reference node,
the at least one processor being configured to determine the second distance comprises the at least one processor being configured to receive, via the communication device, the second distance from the first reference node or the third reference node, and
the at least one processor being configured to determine the third distance comprises the at least one processor being configured to receive, via the communication device, the third distance from the second reference node or the third reference node.

31. The apparatus of claim 29, wherein the at least one processor being configured to determine the first distance comprises the at least one processor being configured to:
- receive, via the communication device, an RTT between the first reference node and the second reference node from the first reference node or the second reference node; and
- calculate the first distance based on the RTT time between the first reference node and the second reference node.

32. The apparatus of claim 18, wherein the first, second, and third reference nodes are the same type of network node.

33. The apparatus of claim 18, wherein the first, second, and third reference nodes comprise base stations.

34. The apparatus of claim 18, wherein the third reference node is not time synchronized with respect to the first reference node and the second reference node.

35. An apparatus, comprising:
- means for transmitting a request to a first reference node to perform a first round-trip-time (RTT) procedure with a second reference node, wherein the first reference node and the second reference node are not time synchronized with respect to each other;
- means for determining a first distance between the first reference node and the second reference node based on the RTT procedure performed by the first reference node and the second reference node, wherein at least one of the first reference node and the second reference node transmits a beamformed reference signal to the other of the first reference node and the second reference node as part of the first RTT procedure;
- means for determining a second distance between the first reference node and a third reference node based on a second RTT procedure performed by the first reference node and the third reference node;
- means for determining a third distance between the second reference node and the third reference node based on a third RTT procedure performed by the second reference node and the third reference node;
- means for determining relative locations of the first and second reference nodes with respect to each other;
- means for determining a relative location of the third reference node with respect to the relative locations of the first and second reference nodes; and
- means for determining absolute locations of the first, second, and third reference nodes from the relative locations of the first, second, and third reference nodes based on (1) the first reference node, the second reference node or both having a known absolute location and at least one known angle-of-arrival (AoA) or angle-of-departure (AoD) of at least one reference signal sent or received by the first, second, or third reference nodes, or (2) the first and second reference nodes having known absolute locations.

36. A non-transitory computer-readable medium storing computer-executable instructions, the computer-executable instructions comprising:
- at least one instruction instructing an apparatus to transmit a request to a first reference node to perform a first round-trip-time (RTT) procedure with a second reference node, wherein the first reference node and the second reference node are not time synchronized with respect to each other;
- at least one instruction instructing the apparatus to determine a first distance between the first reference node and the second reference node based on the RTT procedure performed by the first reference node and the second reference node, wherein at least one of the first reference node and the second reference node transmits a beamformed reference signal to the other of the first reference node and the second reference node as part of the first RTT procedure;
- at least one instruction instructing the apparatus to determine a second distance between the first reference node and a third reference node based on a second RTT procedure performed by the first reference node and the third reference node;
- at least one instruction instructing the apparatus to determine a third distance between the second reference node and the third reference node based on a third RTT procedure performed by the second reference node and the third reference node;
- at least one instruction instructing the apparatus to determine relative locations of the first and second reference nodes with respect to each other;
- at least one instruction instructing the apparatus to determine a relative location of the third reference node with respect to the relative locations of the first and second reference nodes; and
- at least one instruction instructing the apparatus to determine absolute locations of the first, second, and third reference nodes from the relative locations of the first second, and third reference nodes based on (1) the first reference node, the second reference node or both having a known absolute location and at least one known angle-of-arrival (AoA) or angle-of-departure (AoD) of at least one reference signal sent or received by the first, second, or third reference nodes, or (2) the first and second reference nodes having known absolute locations.

* * * * *